US011314445B2

(12) United States Patent
Agarwal et al.

(10) Patent No.: US 11,314,445 B2
(45) Date of Patent: Apr. 26, 2022

(54) PATTERN TRACKING FOR EFFICIENTLY PREDICTING CONTROL PAGES

(71) Applicant: WESTERN DIGITAL TECHNOLOGIES, INC., San Jose, CA (US)

(72) Inventors: Dinesh Kumar Agarwal, Karnataka (IN); Hitesh Golechchha, Karnataka (IN); Sourabh Sankule, Karnataka (IN)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 244 days.

(21) Appl. No.: 16/688,080

(22) Filed: Nov. 19, 2019

(65) Prior Publication Data

US 2021/0149583 A1 May 20, 2021

(51) Int. Cl.
*G06F 3/06* (2006.01)
*G06N 5/04* (2006.01)

(52) U.S. Cl.
CPC .......... *G06F 3/0655* (2013.01); *G06F 3/0604* (2013.01); *G06F 3/0679* (2013.01); *G06N 5/04* (2013.01)

(58) Field of Classification Search
CPC ........ G06F 3/0655; G06F 3/0604; G06N 5/04
See application file for complete search history.

(56) References Cited

U.S. PATENT DOCUMENTS

| 7,509,471 | B2 | 3/2009 | Gorobets |
| 8,219,776 | B2 | 7/2012 | Forhan et al. |
| 8,327,066 | B2 | 12/2012 | Heo et al. |
| 8,539,150 | B2 | 9/2013 | Araki et al. |
| 8,799,559 | B2 | 8/2014 | Sharon et al. |
| 9,111,576 | B2 | 8/2015 | Kim |
| 2011/0010521 | A1* | 1/2011 | Wang .................. G06F 12/1027 711/207 |
| 2019/0243766 | A1* | 8/2019 | Doerner .............. G06F 12/0862 |
| 2021/0049043 | A1* | 2/2021 | Khan ........................ G06F 8/65 |

* cited by examiner

*Primary Examiner* — David Yi
*Assistant Examiner* — Nicholas A. Paperno
(74) *Attorney, Agent, or Firm* — ArentFox Schiff LLP

(57) ABSTRACT

Aspects of a storage device are provided which allow for identification of control page patterns from previous read commands and prediction of control pages to load in advance for subsequent read commands. The storage device includes a memory configured to store data and a plurality of control pages. Each of the control pages includes a plurality of logical addresses associated with the data. A controller is configured to receive from a host device a plurality of read commands associated with a sequence of the control pages. The controller is further configured to identify and store a control page pattern based on the sequence of control pages and to predict one or more of the control pages from one or more of the other control pages in the sequence in a subsequent plurality of read commands.

19 Claims, 15 Drawing Sheets

400

| Control Page (402) | Logical Addresses (404) |
|---|---|
| 0 | 0-999 |
| 1 | 1000-1999 |
| ... | ... |
| 200 | 200000-200999 |
| ... | ... |
| 700 | 700000-700999 |
| ... | ... |

406 points to rows 0 and 1.

PATTERN TRACKING FOR EFFICIENTLY PREDICTING CONTROL PAGES

BACKGROUND

Field

This disclosure is generally related to electronic devices and more particularly to storage devices.

Background

Storage devices enable users to store and retrieve data. Examples of storage devices include non-volatile memory devices. A non-volatile memory generally retains data after a power cycle. An example of a non-volatile memory is a flash memory, which may include array(s) of NAND cells on one or more dies. Flash memory may be found in solid-state devices (SSDs), Secure Digital (SD) cards, and the like.

A flash storage device may store control information associated with data. For example, a flash storage device may maintain control tables that include a mapping of logical addresses to physical addresses. This control tables are used to track the physical location of logical sectors, or blocks, in the flash memory. The control tables are stored in the non-volatile memory to enable access to the stored data after a power cycle.

In a multi-queue depth environment, a controller for the flash storage device may receive multiple read commands from a host device. The commands are stored in a queue which the controller may select for execution. When the controller selects a read command from the queue, the controller reads control information and data for the selected command from the non-volatile memory using the control tables and transfers the data for that read command to the host device before selecting the next command in the queue. The controller may store the control information associated with the data in a volatile memory (e.g. a cache) of the controller to reduce the latency in executing subsequent read commands for the data.

However, when data is randomly written to and read from various blocks of the flash memory with limited cache, the stored control information in cache may quickly accumulate. Thus, for every read command, the controller generally needs to read the NAND cells twice: once to load the control information from the control tables into the volatile memory, and once to obtain the data associated with the loaded control information. This control information loading may frequently occur in the foreground if the flash storage device has a low queue depth (e.g. the read command queue may only hold at most three read commands or some other number). As a result, the flash storage device may have a low input/output operations per second (TOPS) value, impacting the device's random performance. While increasing the size of the cache for control information or repurposing the cache to store data may improve the performance, such increases may also inefficiently raise the cost of the storage device.

SUMMARY

One aspect of a storage device is disclosed herein. The storage device includes a memory configured to store data and a plurality of control pages. Each of the control pages includes a plurality of logical addresses associated with the data. The storage device further includes a controller configured to receive from a host device a plurality of read commands associated with a sequence of the control pages. The controller is further configured to predict one or more of the control pages from one or more of the other control pages in the sequence.

Another aspect of a storage device is disclosed herein. The storage device includes a memory configured to store data and a plurality of control pages. Each of the control pages includes a plurality of logical addresses associated with the data. The storage device further includes a controller configured to receive from a host device a plurality of read commands associated with a sequence of the control pages. The controller is further configured to identify a control page pattern based on the sequence of control pages, and to store the control page pattern in the memory.

A further aspect of a storage device is disclosed herein. The storage device includes a memory configured to store data and a plurality of control pages. Each of the control pages includes a plurality of logical addresses associated with the data. The storage device further includes a controller configured to receive from a host device a plurality of read commands associated with a sequence of the control pages. The controller is further configured to identify a control page pattern based on the sequence of the control pages, and to predict one or more of the control pages from one or more of the other control pages in a subsequent plurality of read commands from the control page pattern.

It is understood that other aspects of the storage device will become readily apparent to those skilled in the art from the following detailed description, wherein various aspects of apparatuses and methods are shown and described by way of illustration.

As will be realized, these aspects may be implemented in other and different forms and its several details are capable of modification in various other respects. Accordingly, the drawings and detailed description are to be regarded as illustrative in nature and not as restrictive.

BRIEF DESCRIPTION OF THE DRAWINGS

Various aspects of the present invention will now be presented in the detailed description by way of example, and not by way of limitation, with reference to the accompanying drawings, wherein.

DETAILED DESCRIPTION

Figure 1:
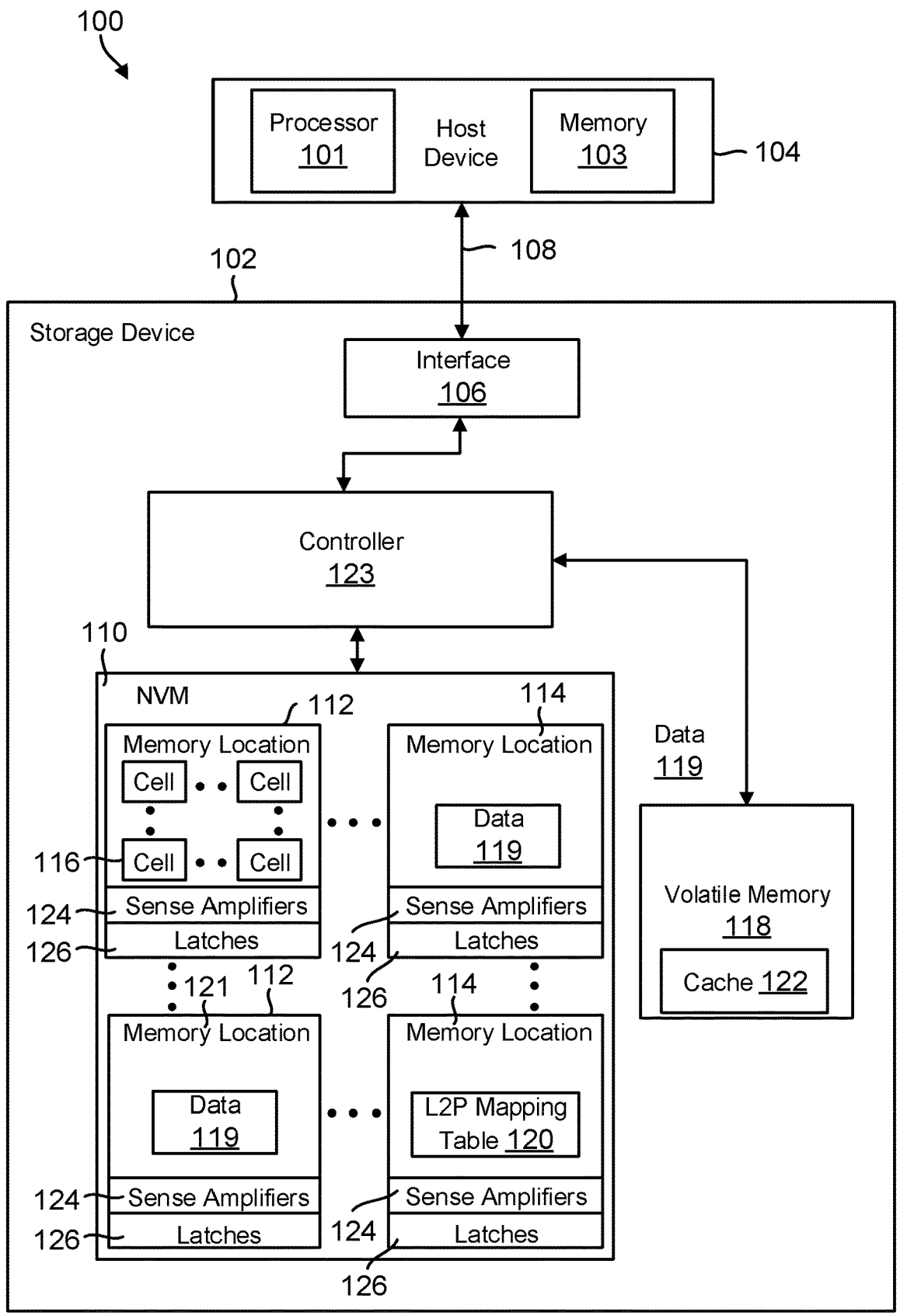
FIG. 1 is a block diagram illustrating an exemplary embodiment of a storage device in communication with a host device.

The detailed description set forth below in connection with the appended drawings is intended as a description of various exemplary embodiments of the present invention and is not intended to represent the only embodiments in which the present invention may be practiced. The detailed description includes specific details for the purpose of providing a thorough understanding of the present invention. However, it will be apparent to those skilled in the art that the present invention may be practiced without these specific details. In some instances, well-known structures and components are shown in block diagram form in order to avoid obscuring the concepts of the present invention. Acronyms and other descriptive terminology may be used merely for convenience and clarity and are not intended to limit the scope of the invention.

The words "exemplary" and "example" are used herein to mean serving as an example, instance, or illustration. Any exemplary embodiment described herein as "exemplary" is not necessarily to be construed as preferred or advantageous over other exemplary embodiments. Likewise, the term "exemplary embodiment" of an apparatus, method or article of manufacture does not require that all exemplary embodiments of the invention include the described components, structure, features, functionality, processes, advantages, benefits, or modes of operation.

In the following detailed description, various aspects of a storage device in communication with a host device will be presented. These aspects are well suited for flash storage devices, such as SSDs and SD cards. However, those skilled in the art will realize that these aspects may be extended to all types of storage devices capable of storing data. Accordingly, any reference to a specific apparatus or method is intended only to illustrate the various aspects of the present invention, with the understanding that such aspects may have a wide range of applications without departing from the spirit and scope of the present disclosure.

When data is randomly written to and randomly read from the storage device and the controller has limited memory (e.g. 128 KB of random access memory (RAM) or another number), the controller generally performs two reads when executing read commands. In particular, the controller reads the logical-to-physical mapping table for the control information (e.g. the logical address associated with the physical address where the data is stored), and then the controller reads the data associated with the control information. When the storage device can only queue a small number of read commands at a time (e.g. the storage device has a low queue depth), the controller typically loads the control information in the foreground when executing each read command. However, this foreground loading prevents the available bandwidth of the NAND storage device from being fully utilized, impacting random performance. While increasing the size of the cache or repurposing the cache to store data may improve the performance, such increases may also inefficiently raise the cost of the storage device.

To reduce the foreground loading and cost-effectively improve the random performance of the storage device, the present disclosure allows the controller to track control pages associated with logical addresses loaded for previous read commands, to identify a pattern from the tracked control pages, and to predict based on the pattern one or more control pages to load in advance for subsequent read commands. The controller may load the one or more predicted control pages while data is being read for previous read commands. As a result, the controller effectively allows predicted control pages to be loaded in the background for subsequent read commands while other control pages and data are being loaded in the foreground for previous read commands, thereby improving performance of the storage device. Moreover, a control page may include a plurality of logical addresses associated with data, for example, one control page may be associated with 1000 logical block addresses (LBAs) or another number. Thus, the controller may also improve speed of the storage device by identifying and tracking control pages for the predictions, rather than more slowly tracking individual LBAs or actual data. The present disclosure thus allows for improved performance in low-cost storage devices with limited cache memory space.

FIG. 1 shows an exemplary block diagram 100 of a storage device 102 which communicates with a host device 104 (also "host") according to an exemplary embodiment. The host 104 and the storage device 102 may form a system, such as a computer system (e.g., server, desktop, mobile/laptop, tablet, smartphone, etc.). The components of FIG. 1 may or may not be physically co-located. In this regard, the host 104 may be located remotely from storage device 102. Although FIG. 1 illustrates that the host 104 is shown separate from the storage device 102, the host 104 in other embodiments may be integrated into the storage device 102, in whole or in part. Alternatively, the host 104 may be distributed across multiple remote entities, in its entirety, or alternatively with some functionality in the storage device 102.

Those of ordinary skill in the art will appreciate that other exemplary embodiments can include more or less than those elements shown in FIG. 1 and that the disclosed processes can be implemented in other environments. For example, other exemplary embodiments can include a different number of hosts communicating with the storage device 102, or multiple storage devices 102 communicating with the host(s).

The host device 104 may store data to, and/or retrieve data from, the storage device 102. The host device 104 may include any computing device, including, for example, a computer server, a network attached storage (NAS) unit, a desktop computer, a notebook (e.g., laptop) computer, a tablet computer, a mobile computing device such as a smartphone, a television, a camera, a display device, a digital media player, a video gaming console, a video streaming device, or the like. The host device 104 may include at least one processor 101 and a host memory 103. The at least one processor 101 may include any form of hardware capable of processing data and may include a general purpose processing unit (such as a central processing unit (CPU)), dedicated hardware (such as an application specific integrated circuit (ASIC)), digital signal processor (DSP), configurable hardware (such as a field programmable gate array (FPGA)), or any other form of processing unit configured by way of software instructions, firmware, or the like. The host memory 103 may be used by the host device 104 to store data or instructions processed by the host or data received from the storage device 102. In some examples, the host memory 103 may include non-volatile memory, such as magnetic memory devices, optical memory devices, holographic memory devices, flash memory devices (e.g., NAND or NOR), phase-change memory (PCM) devices, resistive random-access memory (ReRAM) devices, magnetoresistive random-access memory (MRAM) devices, ferroelectric random-access memory (F-RAM), and any other type of non-volatile memory devices. In other examples, the host memory 103 may include volatile memory, such as random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, and the like). The host memory 103 may also include both non-volatile memory and volatile memory, whether integrated together or as discrete units.

The host interface 106 is configured to interface the storage device 102 with the host 104 via a bus/network 108, and may interface using, for example, Ethernet or WiFi, or a bus standard such as Serial Advanced Technology Attachment (SATA), PCI express (PCIe), Small Computer System Interface (SCSI), or Serial Attached SCSI (SAS), among other possible candidates. Alternatively, the host interface 106 may be wireless, and may interface the storage device 102 with the host 104 using, for example, cellular communication (e.g. 5G NR, 4G LTE, 3G, 2G, GSM/UMTS, CDMA One/CDMA2000, etc.), wireless distribution methods through access points (e.g. IEEE 802.11, WiFi, HiperLAN, etc.), Infra Red (IR), Bluetooth, Zigbee, or other Wireless Wide Area Network (WWAN), Wireless Local Area Network (WLAN), Wireless Personal Area Network (WPAN) technology, or comparable wide area, local area, and personal area technologies.

As shown in the exemplary embodiment of FIG. 1, the storage device 102 includes non-volatile memory (NVM) 110 for non-volatilely storing data received from the host 104. The NVM 110 can include, for example, flash integrated circuits, NAND memory (e.g., single-level cell (SLC) memory, multi-level cell (MLC) memory, triple-level cell (TLC) memory, quad-level cell (QLC) memory, penta-level cell (PLC) memory, or any combination thereof), or NOR memory. The NVM 110 may include a plurality of memory locations 112 which may store system data for operating the storage device 102 or user data received from the host for storage in the storage device 102. For example, the NVM may have a cross-point architecture including a 2-D NAND array of memory locations 112 having n rows and m columns, where m and n are predefined according to the size of the NVM. In the illustrated exemplary embodiment of FIG. 1, each memory location 112 may be a block 114 including multiple cells 116. The cells 116 may be SLCs, MLCs, TLCs, QLCs, and/or PLCs, for example. Other examples of memory locations 112 are possible; for instance, each memory location may be a die containing multiple blocks. Moreover, each memory location may include one or more blocks in a 3-D NAND array. Moreover, the illustrated memory locations 112 may be logical blocks which are mapped to one or more physical blocks.

The storage device 102 also includes a volatile memory 118 that can, for example, include a Dynamic Random Access Memory (DRAM) or a Static Random Access Memory (SRAM). Data stored in volatile memory 118 can include data read from the NVM 110 or data to be written to the NVM 110. In this regard, the volatile memory 118 can include a write buffer and a read buffer for temporarily storing data. While FIG. 1 illustrate the volatile memory 118 as being remote from a controller 123 of the storage device 102, the volatile memory 118 may be integrated into the controller 123.

The memory (e.g. NVM 110) is configured to store data 119 received from the host device 104. The data 119 may be stored in the cells 116 of any of the memory locations 112. As an example, FIG. 1 illustrates data 119 being stored in different memory locations 112, although the data may be stored in the same memory location. In another example, the memory locations 112 may be different dies, and the data may be stored in one or more of the different dies.

Each of the data 119 may be associated with a logical address. For example, the NVM 110 may store a logical-to-physical (L2P) mapping table 120 for the storage device 102 associating each data 119 with a logical address. The L2P mapping table 120 stores the mapping of logical addresses specified for data written from the host 104 to physical addresses in the NVM 110 indicating the location(s) where each of the data is stored. This mapping may be performed by the controller 123 of the storage device. The L2P mapping table may be a table or other data structure which includes an identifier such as a logical block address (LBA) associated with each memory location 112 in the NVM where data is stored. While FIG. 1 illustrates a single L2P mapping table 120 stored in one of the memory locations 112 of NVM to avoid unduly obscuring the concepts of FIG. 1, the L2P mapping table 120 in fact may include multiple tables stored in one or more memory locations of NVM.

Figure 2:
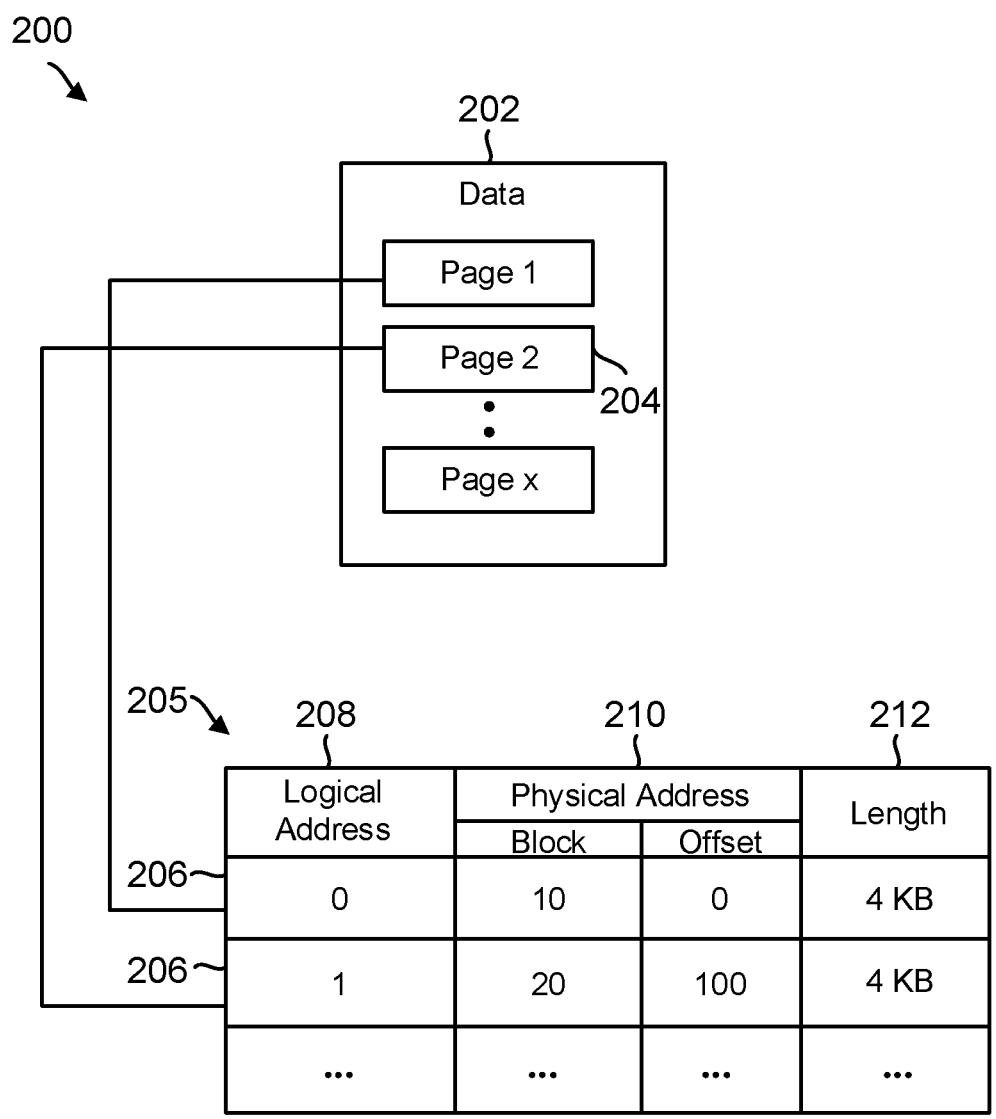
FIG. 2 is a conceptual diagram illustrating an example of a logical-to-physical mapping table in a non-volatile memory of the storage device of FIG. 1.

FIG. 2 is a conceptual diagram 200 of an example of an L2P mapping table 205 illustrating the mapping of data 202 received from a host device to logical addresses and physical addresses in the NVM 110 of FIG. 1. The data 202 may correspond to the data 119 in FIG. 1, while the L2P mapping table 205 may correspond to the L2P mapping table 120 in FIG. 1. In one exemplary embodiment, the data 202 may be stored in one or more pages 204, e.g., pages 1 to x, where x is the total number of pages of data being written to the NVM 110. Each page 204 may be associated with one or more entries 206 of the L2P mapping table 205 identifying a logical block address (LBA) 208, a physical address 210 associated with the data written to the NVM, and a length 212 of the data. LBA 208 may be a logical address specified in a write command for the data received from the host device. Physical address 210 may indicate the block and the offset at which the data associated with LBA 208 is physically written. Length 212 may indicate a size of the written data (e.g. 4 KB or some other size).

Referring back to FIG. 1, the volatile memory 118 also stores a cache 122 for the storage device 102. The cache 122 includes entries showing the mapping of logical addresses specified for data requested by the host 104 to physical addresses in NVM 110 indicating the location(s) where the data is stored. This mapping may be performed by the controller 123. When the controller 123 receives a read command or a write command for data 119, the controller checks the cache 122 for the logical-to-physical mapping of each data fragment. If a mapping is not present (e.g. it is the first request for the data), the controller accesses the L2P mapping table 120 and stores the mapping in the cache 122. When the controller 123 executes the read command or write command, the controller accesses the mapping from the cache and reads the data from or writes the data to the NVM 110 at the specified physical address. The cache may be stored in the form of a table or other data structure which includes a logical address associated with each memory location 112 in NVM where data is being read.

The NVM 110 includes sense amplifiers 124 and data latches 126 connected to each memory location 112. For example, the memory location 112 may be a block including cells 116 on multiple bit lines, and the NVM 110 may include a sense amplifier 124 on each bit line. Moreover, one or more data latches 126 may be connected to the bit lines and/or sense amplifiers. The data latches may be, for example, shift registers. When data is read from the cells 116 of the memory location 112, the sense amplifiers 124 sense the data by amplifying the voltages on the bit lines to a logic level (e.g. readable as a '0' or a '1'), and the sensed data is stored in the data latches 126. The data is then transferred from the data latches 126 to the controller 123, after which the data is stored in the volatile memory 118 until it is transferred to the host device 104. When data is written to the cells 116 of the memory location 112, the controller 123 stores the programmed data in the data latches 126, and the data is subsequently transferred from the data latches 126 to the cells 116.

The storage device 102 includes a controller 123 which includes circuitry such as one or more processors for executing instructions and can include a microcontroller, a Digital Signal Processor (DSP), an Application-Specific Integrated Circuit (ASIC), a Field Programmable Gate Array (FPGA), hard-wired logic, analog circuitry and/or a combination thereof.

The controller 123 is configured to receive a plurality of read commands from the host device 104. For example, the controller 123 may receive multiple read commands, store the commands in a queue in the volatile memory 118, and may execute the commands to read data in order from the NVM 110 for transfer to the host device 104. The controller 123 is further configured to access the L2P mapping table 120 in the NVM 110 and the cache 122 in the volatile memory 118. For example, the controller 123 may receive logical-to-physical address mappings from the NVM 110 and the cache 122 on initial read commands and from the cache 122 on subsequent read commands. The controller 123 is also configured to read the data received from host 104 from one or more memory locations 112. For example, the controller 123 may read the data 119 by activating the sense amplifiers 124 to sense the data from cells 116 into data latches 126, and the controller 123 may receive the data from the data latches 126.

The controller 123 may be further configured to access the memory locations 112 in parallel. For example the memory locations 112 may be blocks 114 stored on different dies of the NVM 110, and each die may be connected to the controller 123 by its own data bus. The controller may read or write data to the cells 116 on the different dies simultaneously over the multiple data buses. Additionally, the controller 123 may be configured to refrain from accessing the memory locations 112 in parallel, and may instead access the memory locations 112 serially. For example, the controller may determine to read or write data to the cells 116 of a memory location 112 in sequence rather than simultaneously over the multiple data buses.

The controller 123 and its components may be implemented with embedded software that performs the various functions of the controller described throughout this disclosure. Alternatively, software for implementing each of the aforementioned functions and components may be stored in the NVM 110 or in a memory external to the storage device 102 or host device 104, and may be accessed by the controller 123 for execution by the one or more processors of the controller 123. Alternatively, the functions and components of the controller may be implemented with hardware in the controller 123, or may be implemented using a combination of the aforementioned hardware and software.

In operation, the host device 104 stores data in the storage device 102 by sending a write command to the storage device 102 specifying one or more logical addresses (e.g., LBAs) as well as a length of the data to be written. The interface element 106 receives the write command, and the controller allocates a memory location 112 in the NVM 110 of storage device 102 for storing the data. The controller 123 stores the L2P mapping in the NVM (and the cache 122) to map a logical address associated with the data to the physical address of the memory location 112 allocated for the data. The controller also stores the length of the L2P mapped data. The controller 123 then stores the data in the memory location 112 by sending it to one or more data latches 126 connected to the allocated memory location, from which the data is programmed to the cells 116.

The host 104 may retrieve data from the storage device 102 by sending a read command specifying one or more logical addresses associated with the data to be retrieved from the storage device 102, as well as a length of the data to be read. The interface 106 receives the read command, and the controller 123 accesses the L2P mapping in the cache 122 or otherwise the NVM to translate the logical addresses specified in the read command to the physical addresses indicating the location of the data. The controller 123 then reads the requested data from the memory location 112 specified by the physical addresses by sensing the data using the sense amplifiers 124 and storing them in data latches 126 until the read data is returned to the host 104 via the host interface 106.

As described above, when multiple read commands are received from the host device 104 via the host interface 106, the controller 123 may execute the commands in the order they are received. However, if the data 119 associated with the read commands was randomly written to and is being randomly read from the cells 116 in the memory locations 112, the cache 122 may quickly become full with logical addresses. Thus, the controller 123 frequently reads the L2P mapping table 120 for the logical address associated with the data 119 before reading the data from the cells 116. If the storage device 102 has a low queue depth, the controller 123 typically reads the logical addresses in the foreground, increasing the latency for executing subsequent read commands and impacting performance.

Figure 3:
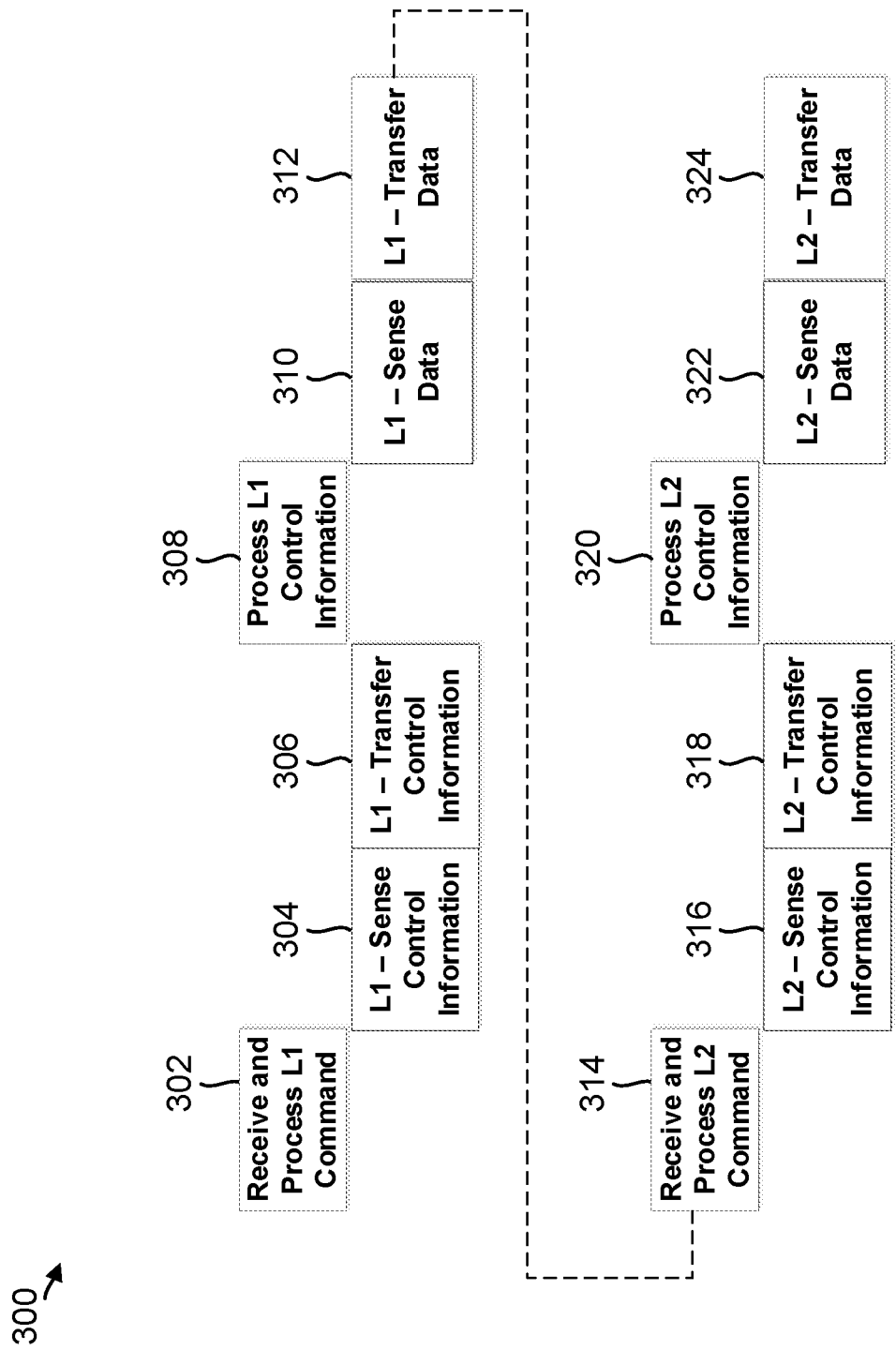
FIG. 3 is a conceptual diagram illustrating an example of read command execution in which control information is loaded prior to sensing of data for each command.

For instance, FIG. 3 illustrates an example diagram 300 of read command execution where control information is loaded in the foreground for a plurality of read commands (referred to herein as L1, L2, L3, etc.) received from a host device. The blocks illustrated in FIG. 3 may be performed, for example, by the controller 123 of FIG. 1. At block 302, the controller receives and processes a read command L1 from the host device. For example, referring to FIG. 1, the controller 123 may receive the read command L1 from the top of a queue of previous read commands received from the host device 104, and the controller 123 may determine that the logical address associated with the read command L1 is not within the cache 122. Accordingly, at block 304, the controller senses the control information associated with the read command L1 from the NAND cells. For example, referring to FIG. 1, the controller 123 may activate sense amplifiers 124 to access the L2P mapping table 120 for the logical address of the data requested by the host device in read command L1. Then, at block 306, the control information is transferred from the NAND cells to the controller. For example, referring to FIG. 1, the logical address sensed by the sense amplifiers 124 may be stored in the data latches 126 and subsequently transferred to the controller 123.

Once the controller receives the control information, at block 308, the controller processes the control information. For example, referring to FIG. 1, the controller 123 may identify the physical address of the data associated with the logical address for read command L1. Subsequently, at block 310, the controller senses the data associated with the read command L1 from the NAND cells. For example, referring to FIG. 1, the controller 123 may activate sense amplifiers 124 to access the cells 116 in the memory locations 112 corresponding to the physical address where the data 119 is stored. Then, at block 312, the data is transferred from the NAND cells to the controller. For example, referring to FIG. 1, the data 119 sensed by the sense amplifiers 124 may be stored in the data latches 126 and subsequently transferred to the controller 123. The controller may then transfer the read data to the host device.

Once the controller finishes executing read command L1, the controller may similarly execute subsequent read commands as described above with respect to blocks 302, 304, 306, 308, 310, and 312. For example, the controller receives and processes the next read command L2 from the host device at block 314, senses the control information associated with the read command L2 from the NAND cells at block 316, receives the control information transferred from the NAND cells to the controller at block 318, processes the control information at block 320, senses the data associated with the read command L2 from the NAND cells at block 322, and receives the data transferred from the NAND cells to the controller at block 324. The aforementioned operations will similarly repeat for read command L3, etc. until all received read commands are fully executed.

However, as illustrated in the example of FIG. 3, when the controller receives and executes the plurality of read commands L1, L2, etc., the control information is repeatedly loaded in the foreground. For example, the controller performs the operations of blocks 304 and 316 sequentially as read commands L1 and L2 are respectively being executed, without simultaneously reading data or performing other operations in the background. As a result, the available bandwidth of the storage device 102 may not be fully utilized and performance may be impacted.

Figure 4:
FIG. 4 is a conceptual diagram illustrating an example mapping of control pages to a plurality of logical addresses.

To improve performance, the controller 123 may be configured to track control pages associated with previous read commands and to predict control pages associated with subsequent read commands. FIG. 4 illustrates an example mapping 400 of control pages 402 to logical addresses 404. The logical addresses 404 may correspond to the logical addresses 208 of FIG. 2. As illustrated, each control page 402 may include a plurality of logical addresses 404 associated with the data requested by each read command. For example, one control page may be associated with 1000 logical block addresses (LBAs) as illustrated in FIG. 4 (e.g. control page 0 may include LBAs: 0-999, control page 1 may include LBAs: 1000-1999, etc.). Alternatively, one or more control pages 402 may be associated with any number of logical addresses 404. The controller 123 may store the control page mapping 400 in the NVM 110 (e.g. in one or more of the memory locations 112).

When the controller 123 receives a plurality of read commands from the host device, the read commands may be associated with a sequence of control pages. For instance, referring to FIG. 3, if read commands L1, L2, and L3 are requesting data 119 associated with logical addresses: 1700, 900, and 1300 respectively, the control pages associated with the read commands may be 1, 0, and 1, respectively.

Thus, the read commands L1, L2, and L3 may be associated with a sequence of control pages: 1, 0, and 1. Similarly, in another example, the controller may receive five read commands L1-L5 specifying logical addresses that are associated with a sequence of control pages: 1, 0, 1, 0, and 1. The sequences of control pages described above are merely examples; any sequence of control pages may be associated with a plurality of read commands.

When the controller receives a plurality of read commands, the controller may identify the sequence of control pages associated with the plurality of read commands. For example, the controller may look up the mapping 400 of control pages 402 to logical addresses 404 in the NVM 110, and identify the entries 406 for the control pages corresponding to the logical addresses specified in the read commands. For instance, if the controller receives the aforementioned read commands L1, L2 and L3 requesting data associated with logical addresses: 1700, 900, and 1300, the controller may identify the sequence of control pages to be 1, 0, and 1 from the mapping 400.

The controller 123 may be configured to predict one or more of the control pages from one or more of the other control pages in the sequence. For example, the controller may be configured to identify a control page pattern based on the sequence of control pages, and to identify one or more predicted control pages from the control page pattern. For instance, in the L1-L5 example above, the controller 123 may identify the numbers: 1010 as a control page pattern in the sequence: 1, 0, 1, 0, and 1, and thus identify the last number (1) in the sequence as the predicted control page. When the controller subsequently receives a plurality of read commands associated with a sequence including this same control page pattern, the controller may predict one or more control pages for the subsequent read commands from the other control pages in the sequence. For instance, if the controller receives read commands L6-L10 and identifies L6-L9 to correspond to the same control page pattern: 1010 as L1-L4, the controller may predict that L10 will be associated with the same control page as L5 (i.e. control page 1). As a result, the controller 123 may load that predicted control page 1 for L10 in advance, e.g. when the controller is reading data for L9 or another prior read command, thereby more fully utilizing the available bandwidth of the storage device 102 and improving storage device performance.

Figure 5A:
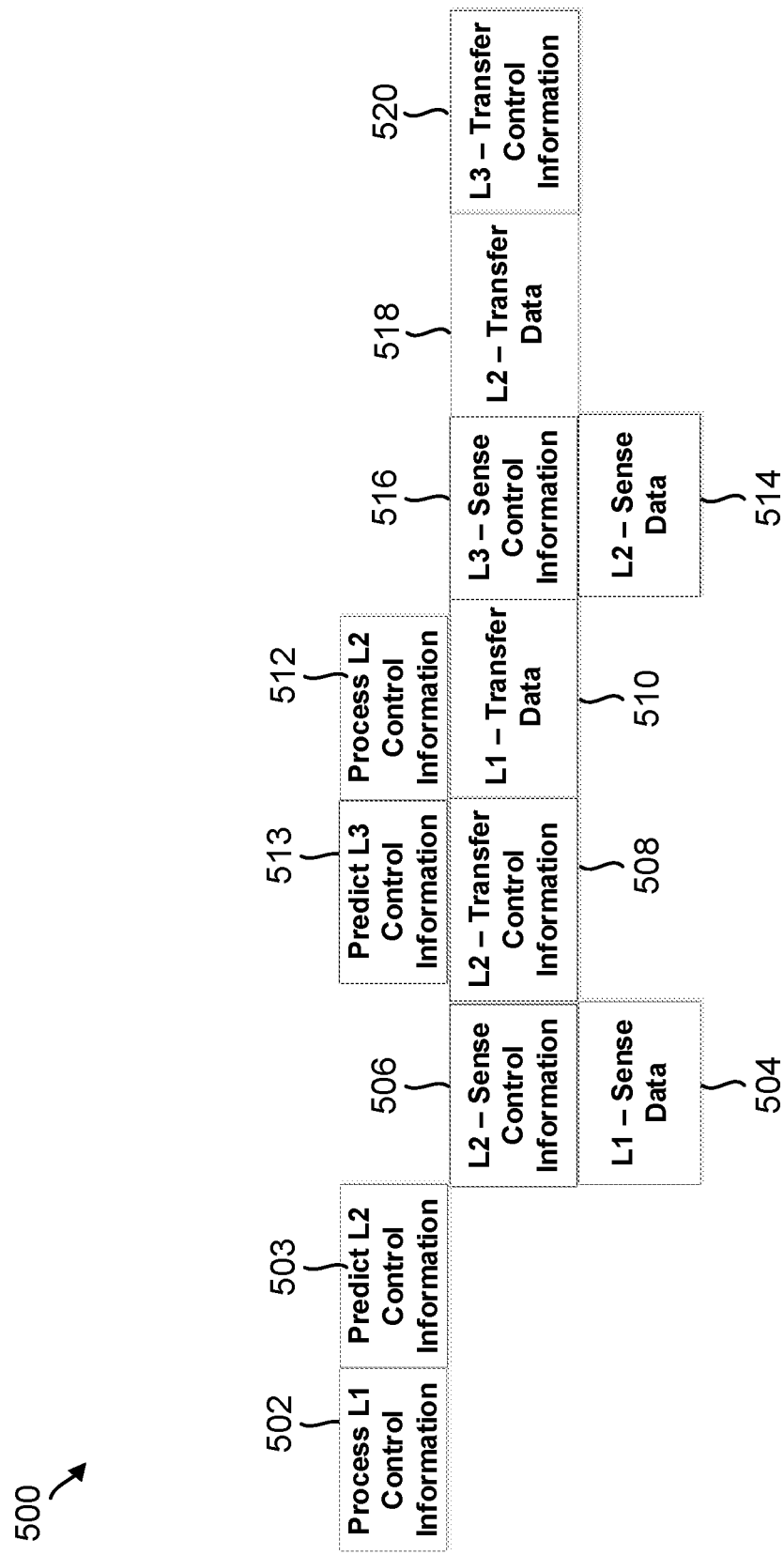
FIGS. 5A-5B are conceptual diagrams illustrating examples of read command execution in which predicted control information is loaded in advance for subsequent read commands.
Figure 5B:
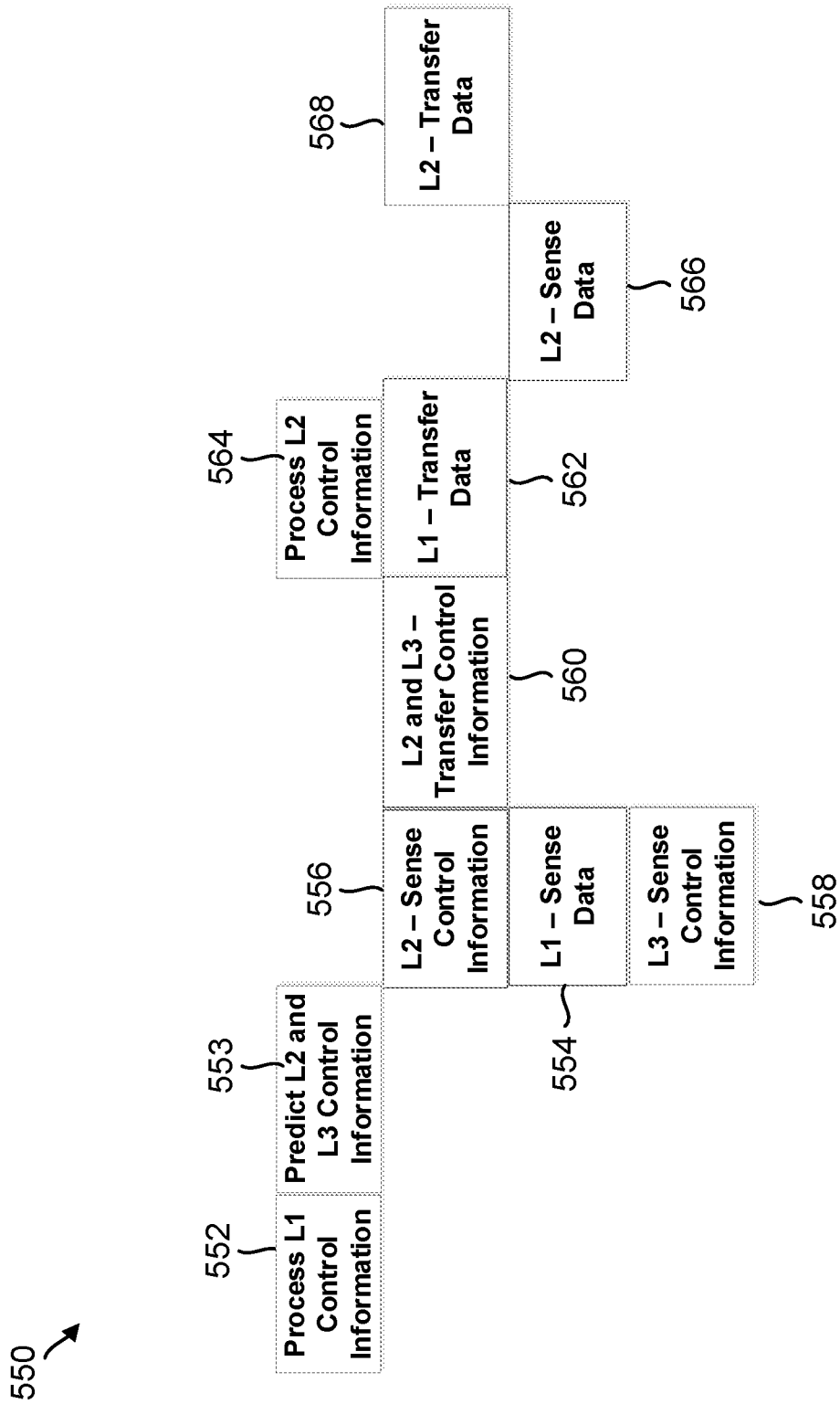

FIGS. 5A-5B illustrate example diagrams 500, 550 of read command execution where predicted control information is loaded in the background as a plurality of read commands L1, L2, L3, etc. received from a host device are being executed. FIG. 5A illustrates an example where the controller may load in advance (e.g. pre-fetch) a predicted control page for one read command at a time (e.g. L2), while FIG. 5B illustrates an example where the controller may load in advance a predicted control pages for multiple read commands at a time (e.g. L2 and L3). The example of FIG. 5B may occur, for instance, when the controller is configured to access the control pages including the logical addresses associated with read commands L2 and L3 in parallel (for example, using multiple data buses as described above). The blocks illustrated in FIGS. 5A and 5B may be performed, for example, by the controller 123 of FIG. 1.

Referring to FIG. 5A, at block 502, the controller processes control information previously received for the read command L1. Block 502 may correspond to block 308 of FIG. 3, which may occur after the controller receives and processes the read command L1 from a host device (e.g. block 302), senses the control information associated with the read command L1 from the NAND cells (e.g. block 304), and obtains the control information transferred from the NAND cells (e.g. block 306). For example, at block 502 and referring to FIG. 1, the controller 123 may identify the physical address of the data associated with the logical address for a previously received read command L1 as described above.

Furthermore, in contrast to the example of FIG. 3, at block 503, the controller predicts a control page associated with subsequent read command L2. As described above, L1 may be associated with a sequence of control pages, and the controller may identify a control page pattern based on the sequence and identify a predicted control page for L2 based on the pattern. Subsequently, at block 504, the controller may sense the data associated with the read command L1 from the NAND cells (e.g. as described in connection with block 310 of FIG. 3), and at block 506, the controller may simultaneously sense the predicted control information associated with the read command L2 from the NAND cells (e.g. as described in connection with block 316 of FIG. 3). Afterwards, at blocks 508 and 510, the control information for L2 and the data for L1 may be respectively transferred from the NAND cells to the controller (e.g. as described respectively in connection with blocks 318 and 312).

Subsequently, at block 512, the controller processes the control information for L2 (e.g. as described in connection with block 320). Similarly, the controller may also predict a control page associated with a subsequent read command L3 at block 513, as described above. While FIG. 5A illustrates blocks 512, 513 occurring during the L1 data or L2 control information transfer, blocks 512, 513 may alternatively occur once the data and control information are fully transferred. Afterwards, at block 514, the controller may sense the data associated with the read command L2 from the NAND cells (e.g. as described in connection with block 322 of FIG. 3), and at block 516, the controller may simultaneously sense the predicted control information associated with the read command L3. The controller may subsequently receive the data and control information transferred from the NAND cells (e.g. at blocks 518 and 520), and thereafter repeat the aforementioned operations for subsequent read commands.

Referring now to FIG. 5B, at block 552, the controller processes control information previously received for the read command L1. For example, block 552 may correspond to block 308 of FIG. 3. Furthermore, in contrast to the example of FIG. 5A, at block 553, the controller also predicts control pages associated with multiple, subsequent read commands L2 and L3. For example, as described above, L1 may be associated with a sequence of control pages, and the controller may identify a control page pattern based on the sequence and identify a predicted control page for L2 based on the pattern. Similarly, L2 may be associated with the same sequence or a different sequence of control pages, and the controller may identify a control page pattern based on the sequence and identify a predicted control page for L3 based on the pattern. Thus, at block 554, the controller may sense the data associated with the read command L1 from the NAND cells (e.g. as described in connection with block 310 of FIG. 3), and at blocks 556 and 558, the controller may simultaneously sense the control information associated with the read commands L2 and L3 in parallel from the NAND cells (e.g. such as described in connection with block 316 of FIG. 3). As a result, at blocks 560 and 562, the control information for L2 and L3 and the data for L1 may be respectively transferred from the NAND cells to the controller (e.g. such as described respectively in connection with blocks 312 and 318).

Subsequently, at block 564, the controller may process the control information for L2 (e.g. as described in connection with block 320). While FIG. 5B illustrates block 564 occurring during the L1 data transfer, the processing at block 564 may alternatively occur after the data and control information are fully transferred. Afterwards, at block 566, the controller may sense the data associated with the read command L2 from the NAND cells (e.g. as described in connection with block 322 of FIG. 3), and subsequently obtain the data transferred from the NAND cells (e.g. at block 568). The controller may thereafter repeat the aforementioned operations for L3 and subsequent read commands.

Figure 6:
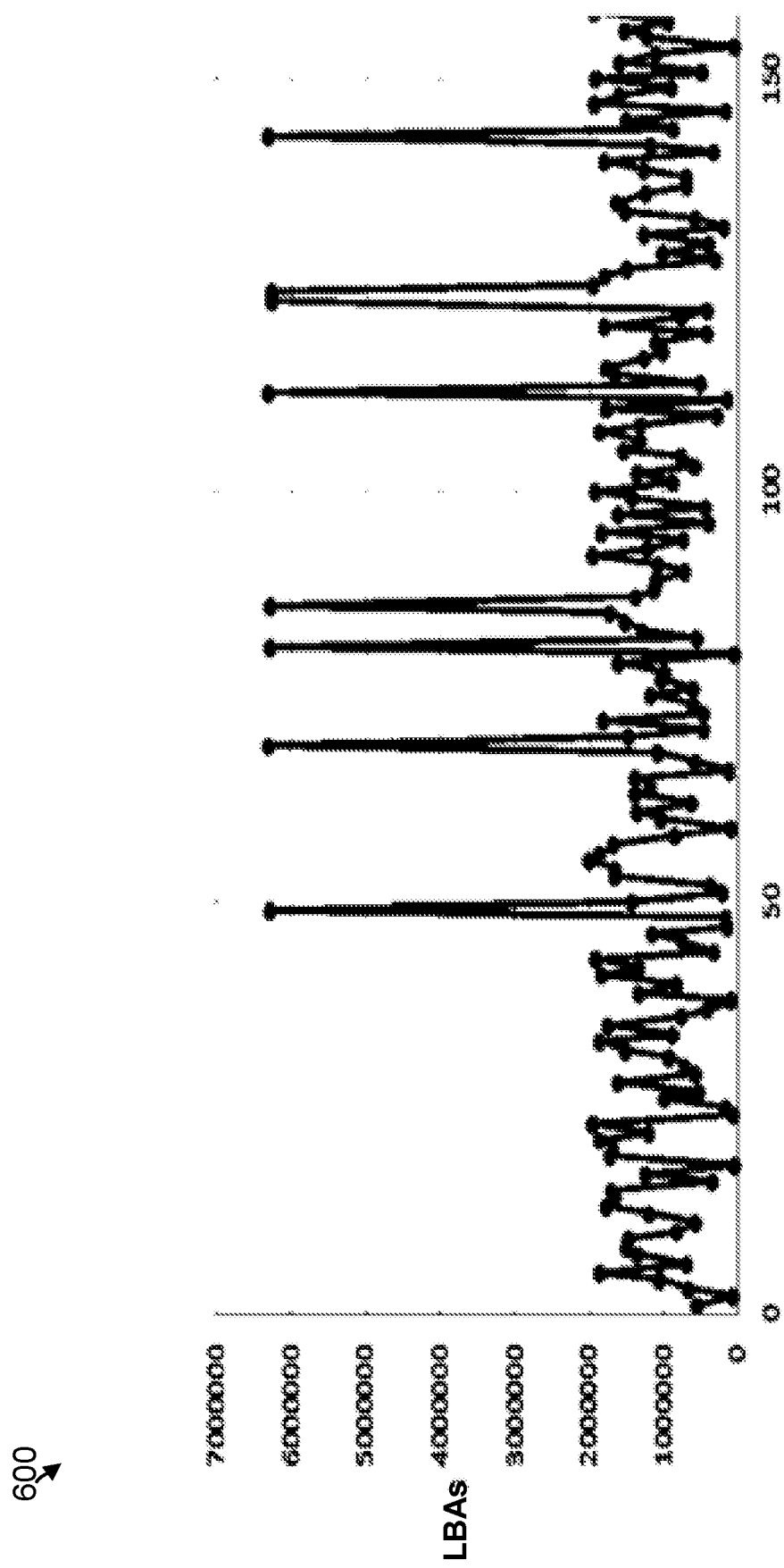
FIG. 6 is an example chart of logical addresses associated with a plurality of read commands.

To facilitate the predicting of control information for read commands in low-cost storage devices with limited cache (such as storage device 102), the controller may track sequences of control pages rather than actual LBA sequences. FIG. 6 illustrates an example chart 600 illustrating multiple read commands associated with various LBAs which are received by the controller from the host device. As illustrated in the example, different read commands may be associated with LBAs spanning from logical address 0 to logical addresses, e.g., over 6000000. Therefore, if the actual LBAs themselves were tracked in the predicting of control information as described above, a significant amount of memory in the cache 122 may be required to store the various patterns from which the predicted control pages may be identified. Additionally, predicting the individual LBA for a subsequent read command may be difficult to achieve and possibly result in less accurate predictions.

Figure 7:
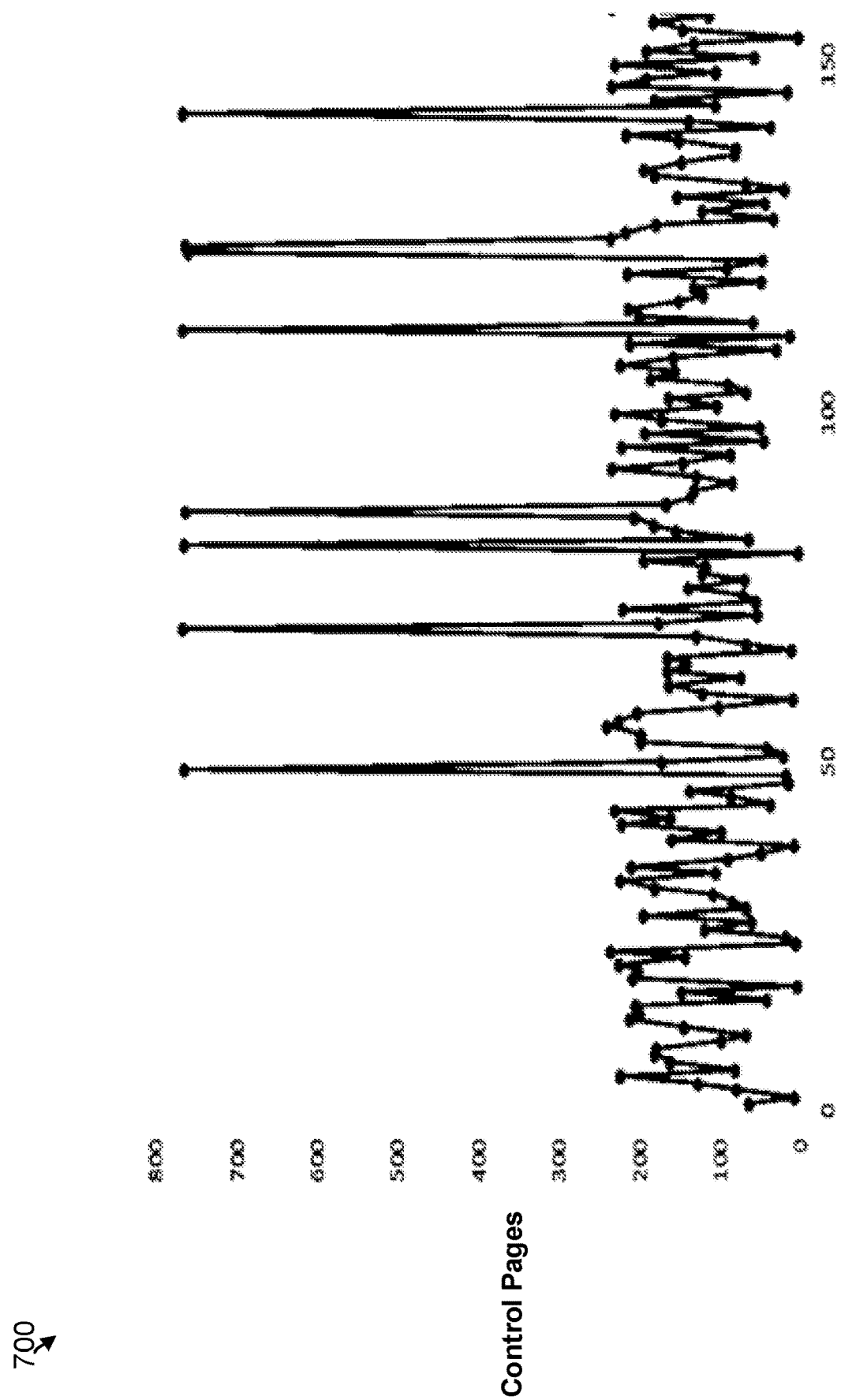
FIG. 7 is an example chart of control pages including the logical addresses associated with the plurality of read commands of FIG. 6.

Accordingly, to address the memory constraints of low-cost storage devices, the present disclosure tracks control pages and identifies patterns from the control pages. For example, FIG. 7 illustrates an example chart 700 illustrating the multiple read commands of FIG. 6, but with the LBAs converted to corresponding control pages. The control pages may correspond to the control pages 402 of FIG. 4, and include a plurality of logical addresses (such as logical addresses 404 of FIG. 4). For example, one control page may be associated with 1000 logical block addresses (LBAs) (e.g. control page 0 may include LBAs: 0-999, control page 1 may include LBAs: 1000-1999, etc.), or another number. Other amounts of LBAs per control page are possible; for example, in the examples of FIGS. 6 and 7, one hundred control pages may encompass one million LBAs. Thus, by tracking control pages rather than individual logical addresses, significantly less memory in the cache 122 may be required to store the various control page patterns from which predicted control pages may be identified. For instance, one 4K page may encompass 4 MB of LBAs. The tracking of patterns of control pages, which may each include thousands of logical addresses, also improves the accuracy of predictions as opposed to tracking individual logical addresses.

Figure 8:
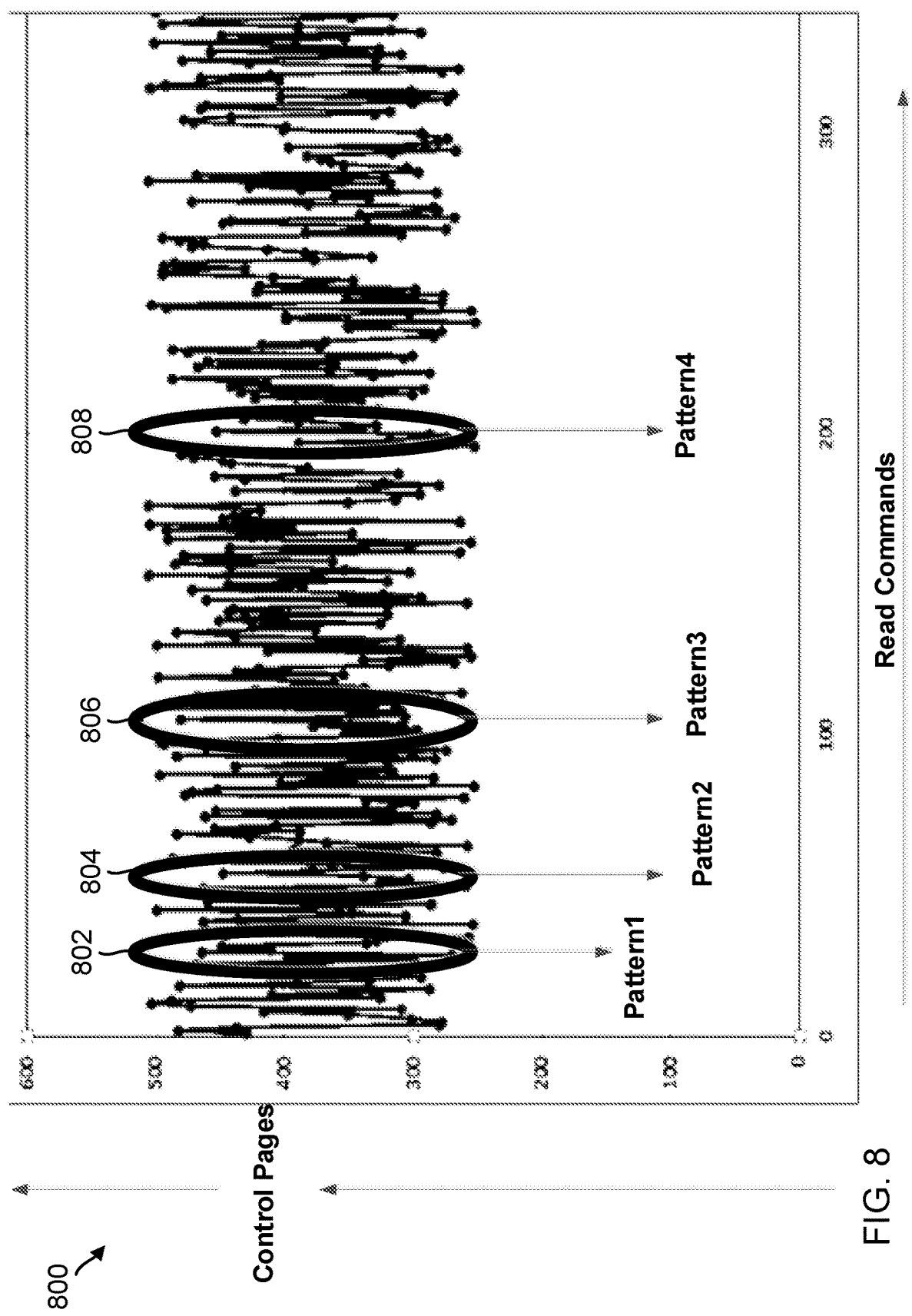
FIG. 8 is an example chart illustrating various control page patterns identified from sequences of control pages.

FIG. 8 illustrates an example chart 800 of control pages associated with multiple read commands including various control page patterns. As illustrated in FIG. 8 and described above, different patterns may be identified from different sequences of control pages across a plurality of different read commands. For instance, as illustrated in FIG. 8, the controller may identify control page patterns 802, 804, 806, and 808. In one example, control page pattern 802 may be associated with a sequence of control pages: 400, 300, 500, 300, 400 for read commands 20-25. The other control page patterns 804, 806, 808 may be associated with different sequences of control pages for other read commands.

As the controller receives read commands from the host device and tracks the associated control pages, the controller may identify the patterns and generate unique keys for each pattern. The controller may store the unique keys for each pattern and a predicted control page based on the pattern in the memory (e.g. volatile memory 118 or the NVM 110). The controller may also apply an offset to the control pages in the pattern, such as a weighted average or minimum or maximum value of the control pages, and store the offset in the memory. The offset may be used to identify control page patterns and predicted control pages in different ranges of control pages. If the controller identifies the tracked pattern recurring in subsequent read commands, the controller may load the predicted control page in advance of executing the subsequent command. When the controller later executes the subsequent command, the controller may identify the logical address from the predicted control page and sense the corresponding data 119 as described above. If the prediction is successful, the controller may update a stored frequency indicating a success of the control page pattern.

An example of this operation is described below with reference to Table 1, which may include information for the identified control page patterns such as the four control page patterns 802, 804, 806, and 808 illustrated in FIG. 8. The information may be stored in a table or other data structure of the volatile memory 118 or the NVM 110.

TABLE 1

| Tracking | Information | | | |
|---|---|---|---|---|
| Control Page Pattern 1 | Unique Key 1 | Predicted Control Page 1 | Frequency | Offset |
| Control Page Pattern 2 | Unique Key 2 | Predicted Control Page 2 | Frequency | Offset |
| Control Page Pattern 3 | Unique Key 3 | Predicted Control Page 3 | Frequency | Offset |
| Control Page Pattern 4 | Unique Key 4 | Predicted Control Page 4 | Frequency | Offset |

In an example, the controller may identify a sequence of control pages from a plurality of read commands. Generally, each read command may specify a logical address, such as a LBA. For instance, the controller may receive a set of read commands L1, L2, L3, L4, L5, L6, L7, and L8 each specifying a logical address associated with requested data. The controller first converts the logical addresses into control pages. For instance, referring to FIG. 4, the controller may store a mapping 400 of control pages to logical addresses in the NVM, and the controller may translate each logical address to the associated control page by looking up the corresponding entries 406 in the mapping 400. For clarity, the control pages associated with the read commands L1, L2, L3, L4, L5, L6, L7, and L8 will be referred to as G1, G2, G3, G4, G5, G6, G7, and G8. While the above example references eight read commands associated with eight control pages, any number of read commands associated with control pages may be received.

The controller may then identify the sequence of control pages from the aforementioned set of read commands. The sequence of control pages may be identified from a predetermined number of consecutive or non-consecutive read commands. For example, the controller may identify the control page sequence from the last four read commands received from the host device, the last eight read commands, the last alternating or time-specific read commands (e.g. every other read command, every fourth read command, etc.), or any other number of consecutive or non-consecutive read commands. In the example of FIG. 8, the controller may identify the sequence of control pages to be associated with every last four read commands (e.g. L1, L2, L3, L4, followed by L2, L3, L4, L5, etc.). Thus, one sequence of control pages may include control pages G1, G2, G3, G4, another sequence of control pages may include G2, G3, G4, G5, etc.

After the controller identifies a sequence of control pages, the controller may identify a control page pattern based on the sequence. For example, the controller may apply an offset (e.g. a weighted average or minimum or maximum control page value) to the control page sequence to shift the control page sequence to a base range, and thereafter generate a unique key for the control page sequence. For example, where the sequence of control pages is G1, G2, G3, G4, the controller may apply an offset g to the control page associated with each read command in order to identify the control page pattern. Thus, the controller may identify one control page pattern to be (G1-g), (G2-g), (G3-g), and (G4-g). If the control page sequence is already at a base range, for instance, the minimum control page value is already 0, and so the control page pattern may be the sequence of control pages G1, G3, G3, G4, without an applied offset.

After identifying the control page pattern, the controller may generate a unique key for the control page pattern and identify a predicted control page from the control page pattern. For example, the predicted control page may be the next control page in the sequence. The controller may then store the key, the offset, the predicted control page, and an initial frequency (e.g. 0) associated with the control page pattern in the volatile memory 118 or NVM 110. For example, where the identified control page pattern is G1, G3, G3, G4, the controller may generate a key K1 for the above pattern, and identify the predicted control page P1 to be the next control page in the sequence, e.g., G5. Similarly, if the identified control page pattern includes the applied offset such as (G1-g), (G2-g), (G3-g), and (G4-g), the predicted control page P1 may similarly include the applied offset, e.g. (G5-g).

As numerous control page patterns are identified, the required memory to store the information in Table 1 may be quite large. As an example, a controller may identify two thousand control page patterns and thus generate two thousand different keys, which may in total require between 32 KB-64 KB of memory to store all the information for the tracked control pages. While the required memory may increase proportionally to the number of control page patterns being stored, the accuracy of prediction also increases as more control page patterns are identified and tracked.

Putting this together with the example of FIG. 8, after the controller receives read commands 20-25 (hereafter referred to as L1, L2, L3, L4, and L5 for clarity) and identifies an associated sequence of control pages G1, G2, G3, G4, and G5, the controller may identify the control page pattern 802 from the sequence. The control page pattern 802 may include, for instance, the first four control pages of the sequence offset by an average or minimum value of the control pages in the sequence (G1-g, G2-g, G3-g, G4-g). For example, where the sequence of control pages is identified to be 400, 300, 500, 300, and 400 as described above, the controller may identify the control page pattern 802 from the sequence by applying its minimum value as an offset g. In particular, the controller may calculate the minimum value of the aforementioned sequence of control pages to be 300, and subtract each control page by that offset to result in a base sequence: 100, 0, 200, 0, 100. The controller may then identify the control page pattern 802, e.g. G1-g, G2-g, G3-g, G4-g, to be 100, 0, 200, and 0 for example, and generate a unique key for the control page pattern 802 for storing in the memory. The unique key may be, for instance, an alphanumeric representation of the control pages such as 10002000 in the example above, or some other identifier. The controller may then identify the predicted control page K1 from the sequence to be G5-g, in this example 100, which corresponds to the last number in the aforementioned base sequence. The controller may store the key (e.g. 10002000), the predicted control page (e.g. 100), the initial frequency (e.g. 0) and the offset (e.g. 300) in the memory (e.g. volatile memory 118 or NVM 110) such as in accordance with Table 1 above. The controller may similarly repeat the process for control page patterns 804, 806, and 808.

As the controller receives subsequent read commands L6, L7, L8, L9, the controller may search the memory (e.g. Table 1) for matching control page patterns while tracking control page patterns as described above. For instance, after receiving read commands L6, L7, L8, and L9, if the controller identifies the associated sequence of control pages G6, G7, G8, and G9 to also be 400, 300, 500, 300, the controller may detect a match with control page pattern 802 after applying the offset g. For example, the controller may first subtract the offset (e.g. 300) from the subsequent sequence: 400, 300, 500, 300 to form the base pattern (e.g. 100, 0, 200, 0), compare the base pattern with the tracked control page patterns in the memory, and subsequently detect a match with the control page pattern 802. The controller may then identify the predicted control page associated with the control page pattern 802 (e.g. 100) and add back the offset (e.g. 300) to predict the control page for G10 (e.g. 400). The controller may then proceed to load the control page predicted for G10 in advance of the next read command L10. For instance, the controller may load the predicted control page in the cache 122.

After the controller receives the subsequent read command L10, the controller identifies the logical address specified in the received read command and searches the memory (e.g. cache 122) to determine if the logical address is included in the predicted control page. For example, if the predicted control page (e.g. 100) includes LBAs: 999000-1000000 and the specified logical address is within that range, the controller will proceed to sense the corresponding data in response to a successful prediction (e.g. as described above with respect to FIGS. 5A-5B). The controller may then update the frequency (e.g. incremented by 1) associated with control page pattern 802. However, if the specified logical address is not within the range, the controller will proceed to sense the correct logical address from the L2P mapping table 120 in response to a failed prediction and otherwise proceed to sense the data as described above with respect to FIGS. 5A-5B. The controller may then refrain from updating the frequency. Additionally, the controller may be configured to determine whether a threshold number of failed predictions occurs for a particular control page pattern, in which case the controller may remove the control page pattern from being tracked in the memory (e.g. from Table 1) and replace it with another control page pattern. The controller may perform similar operations as described above with respect to any of the control page patterns illustrated in FIG. 8.

Figure 9:
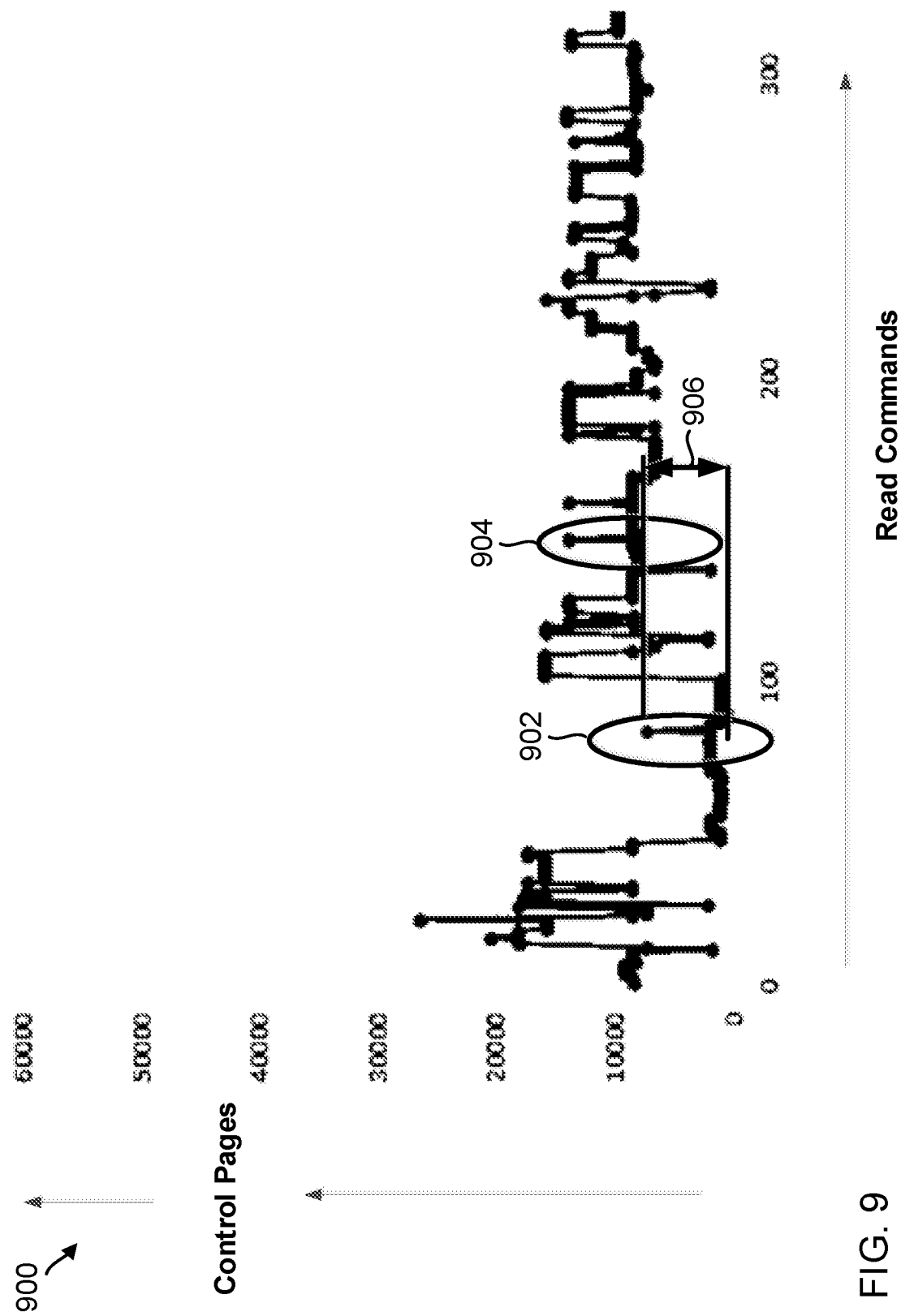
FIG. 9 is an example chart illustrating a recurring control page pattern that is offset to a matching pattern of control pages.

While the aforementioned example describes control page prediction for identical sequences of control pages, the sequences of control pages may be shifted with respect to each other. For example, FIG. 9 illustrates an example diagram 900 in which a control page pattern 902 is identified by the controller to match another control page pattern 904, but where the control page pattern 904 is shifted by an offset 906 with respect to the control page pattern 902.

In such case, the controller identifies the control page patterns 902, 904 as described above with respect to FIG. 8, and further identifies and applies the offset 906 (e.g. the weighted average, minimum, maximum, etc.) to the control page pattern 904 to account for the shifting. For example, the controller may calculate the weighted average (e.g. offset 906) of control page pattern 904, subtract that offset 906 from the control page pattern 904 to form the base pattern, compare the base pattern with the tracked control page patterns in the memory (e.g. Table 1) including control page pattern 902, and subsequently detect a match with control page pattern 902. The controller may then identify the predicted control page associated with the control page pattern 902 stored in the memory (e.g. as described above with respect to FIG. 8) and add back the offset 906 to predict the control page corresponding to control page pattern 904. As a result, the controller may detect matches of control page patterns even in different sequences of control pages by applying the offset, rather than tracking the actual values of the control pages themselves.

Figure 10:
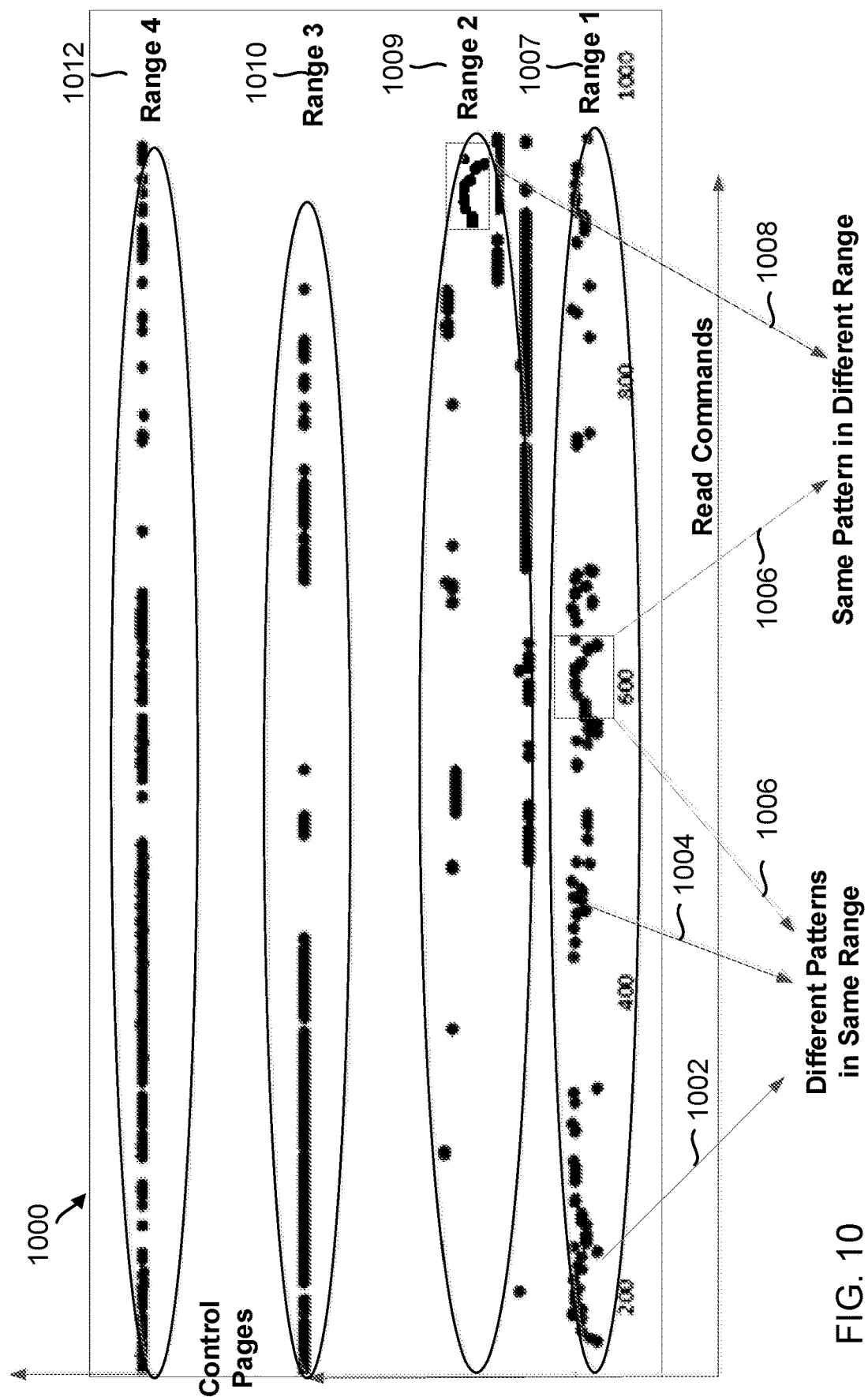
FIG. 10 is an example chart illustrating different ranges of control pages including a recurring control page pattern.

In some cases, the control page patterns identified from different read commands may be in different ranges. For example, FIG. 10 illustrates an example diagram 1000 in which multiple control page patterns 1002, 1004, 1006 are located within one range 1007 of control pages, but where one of the control page patterns 1006 is identified by the controller to match another control page pattern 1008 in a different range 1009 of control pages. For instance, example diagram 1000 illustrates control pages located in four different ranges 1007, 1009, 1010, 1012, where each range is separated from an adjacent range by a specified or calculated offset (e.g. a weighted average of the control pages in a particular range). In such case, the controller may identify control page patterns (e.g. 1002, 1004, 1006) within a single range of control pages as described above with respect to FIG. 8, and if the controller determines that a subsequent control page pattern (e.g. 1008) is repeated in another range of control pages, the controller may further apply the offset to identify the subsequent control page pattern as described above with respect to FIG. 9.

Moreover, when the controller identifies a control page pattern (e.g. 1002, 1004, 1006) from read commands in a first range 1007 of control pages, the controller may refrain from identifying the control page pattern from read commands in a second range 1009, 1010, or 1012 of control pages. Thus, if the controller receives a plurality of read commands associated with control pages across different ranges, the controller may ignore control pages in other ranges when identifying control page patterns. For example, as illustrated in FIG. 10, read command L600 (from which control page pattern 1006 is partly identified) may be associated with different control pages in ranges 1007, 1009, 1012. Accordingly, when identifying the control page pattern 1006 in range 1007, the controller may refrain from including the control pages of ranges 1009 and 1012. The controller may operate similarly when identifying control page patterns 1002, 1004, and 1008 in their respective ranges. As a result, inconsistent control pages may be removed from pattern tracking, improving the accuracy of a successful prediction.

Figure 11:
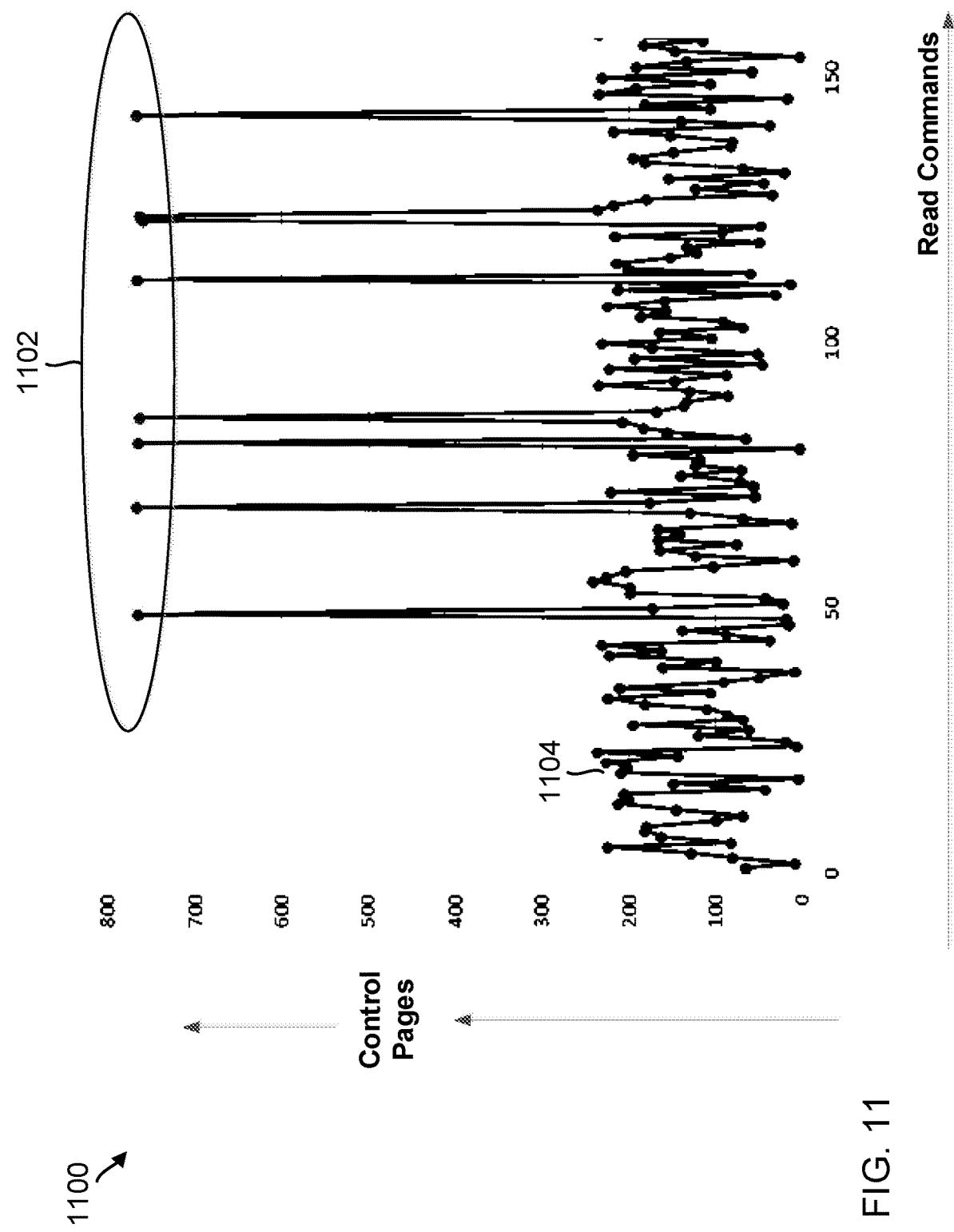
FIG. 11 is an example chart illustrating outlier control pages associated with a plurality of read commands.

In other cases, the controller may identify outlier control pages when performing pattern tracking. FIG. 11 illustrates an example diagram 1100 in which multiple outlier control pages 1102 associated with read commands and relative to other control pages 1104 may be identified by the controller. In one example, the outlier control pages 1102 may be associated with file system reads within a single range of control pages (e.g. between control pages 700 and 800). In such case, the controller may refrain from identifying control page patterns from read commands including control pages within this single range (e.g. the outlier control pages) to improve accuracy of pattern tracking and prediction, as described above with respect to FIG. 10. The controller may also separately cache the outlier control pages in cache 122 as it tracks and predicts the control pages for other read commands.

Figure 12A:
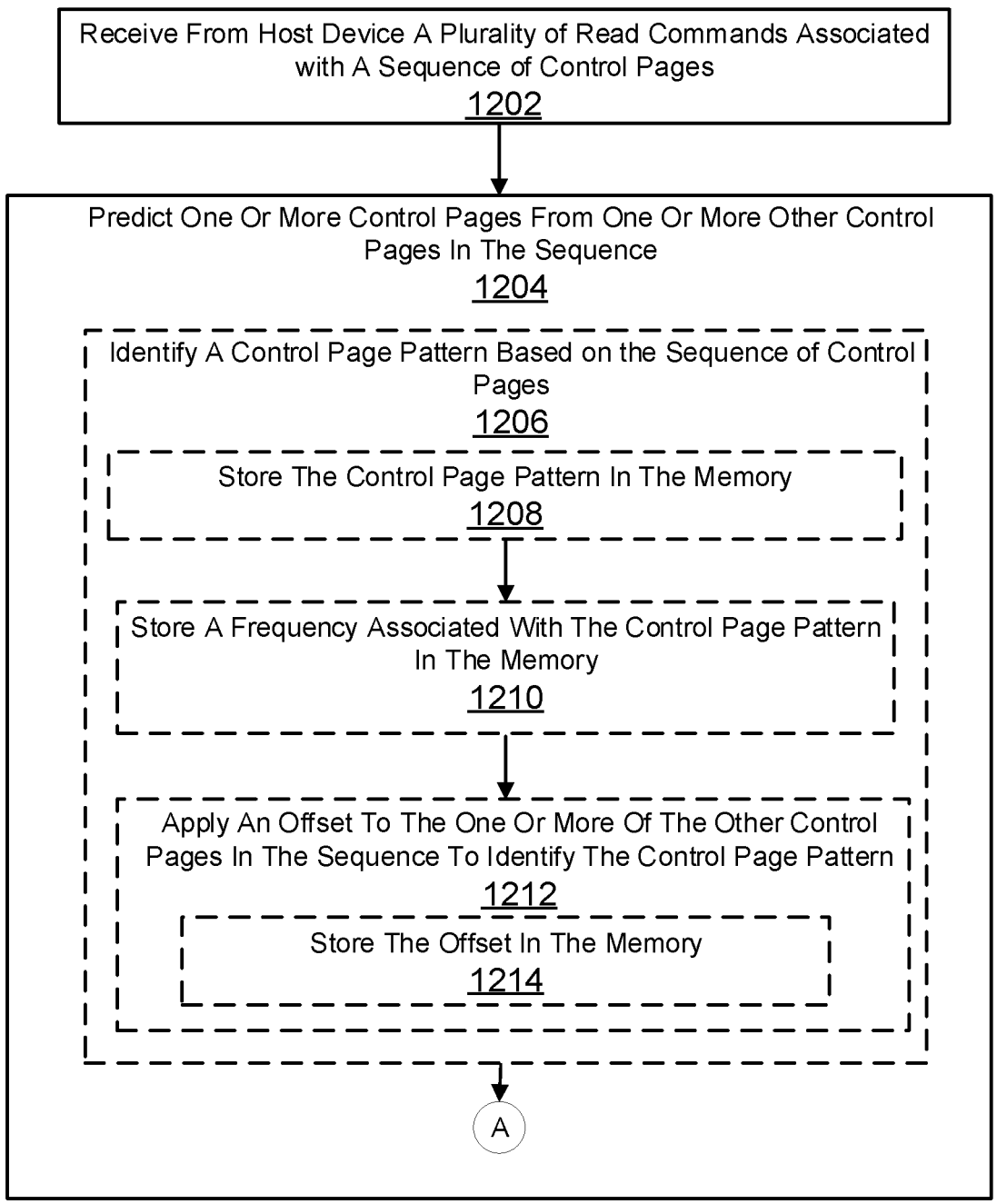
FIGS. 12A-12B are a flow chart illustrating an exemplary method for predicting one or more control pages from one or more other control pages in a sequence of control pages.
Figure 12B:
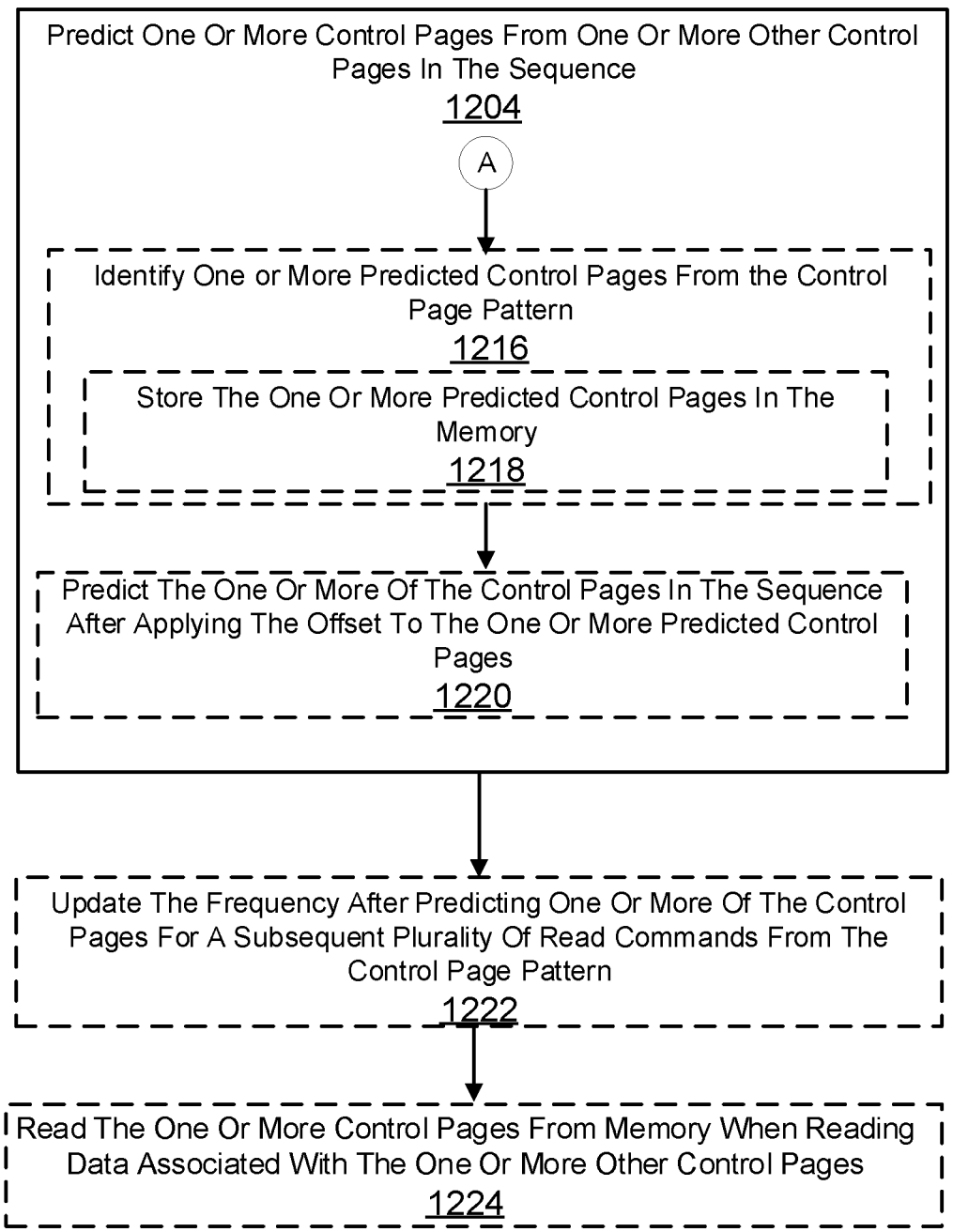

FIGS. 12A and 12B are a flowchart 1200 illustrating an exemplary embodiment of a method for predicting one or more control pages from one or more other control pages in a sequence of control pages. For example, the method can be carried out in a storage device 102, such as the one illustrated in FIG. 1. Each of the steps in the flow chart can be controlled using the controller as described below (e.g. controller 123), or by some other suitable means.

As represented by block 1202, the controller receives from a host device a plurality of read commands associated with a sequence of control pages. A memory of the storage device stores data and a plurality of control pages. Each of the control pages includes a plurality of logical addresses associated with the data. For example, referring to FIGS. 1-4, the controller 123 may receive a plurality of read commands from the host device 104 which are associated with a sequence of control pages 402. For instance, some example read commands L1, L2, and L3 requesting data 119 stored in the NVM 110 may be associated with logical addresses: 1700, 900, and 1300 respectively. The controller may look up a mapping 400 of control pages 402 to logical addresses 404 stored in the NVM 110, and identify the entries 406 for the control pages corresponding to the logical addresses 208 specified in the read commands. For instance, the controller may identify the sequence of control pages associated with read commands L1, L2, and L3 to be 1, 0, and 1 from the mapping 400. The controller may store the sequence of control pages in the volatile memory 118 or NVM 110.

The plurality of read commands associated with the sequence of the control pages may comprise one of consecutive read commands or non-consecutive read commands received from the host device. For example, referring to FIGS. 1 and 8, the controller 123 may identify the control page sequence from the last four read commands received from the host device 104, the last eight read commands, the last alternating or time-specific read commands (e.g. every other read command, every fourth read command, etc.), or any other number of consecutive or non-consecutive read commands. In the example of FIG. 8, the controller 123 may identify the sequence of control pages to be associated with every last four read commands (e.g. L1, L2, L3, L4, followed by L2, L3, L4, L5, etc.). Thus, one sequence of control pages may include control pages G1, G2, G3, G4, another sequence of control pages may include G2, G3, G4, G5, etc.

As represented by block 1204, the controller predicts one or more of the control pages from one or more of the other control pages in the sequence. For example, referring to FIGS. 1 and 5A-5B, the controller 123 may be configured to identify a control page pattern based on the sequence of control pages, and to identify one or more predicted control pages from the control page pattern. When the controller subsequently receives a plurality of read commands associated with a sequence including this same control page pattern, the controller may predict one or more control pages for the subsequent read commands from the other control pages in the sequence. As a result, the controller 123 may load that predicted control page in advance, e.g. as described in connection with blocks 506, 508, 516, 520, 556, 558, and 560 of FIGS. 5A and 5B, thereby more fully utilizing the available bandwidth of the storage device 102 and improving storage device performance.

As represented by block 1206, the controller identifies a control page pattern based on the sequence of the control pages. The controller may store the control page pattern in the memory, as represented by block 1208. The controller may also store a frequency associated with the control page pattern in the memory, as represented by block 1210. For example, referring to FIG. 8, as the controller 123 receives read commands from the host device 104 and tracks the associated control pages, the controller may identify control page patterns 802, 804, 806, 808 and generate unique keys for each pattern. For instance, after the controller receives read commands and identifies an associated sequence of control pages G1, G2, G3, G4, and G5, the controller may identify the control page pattern 802 to be the first four control pages of the sequence (e.g. G1, G2, G3, G4). The controller may store the unique key and a frequency of success for each pattern in the memory (e.g. volatile memory 118 or the NVM 110).

As represented by block 1212, the controller may apply an offset to the one or more of the other control pages in the sequence to identify the control page pattern. The offset may comprise one of an average weightage or a minimum weightage of the one or more of the other control pages in the sequence, for example. The controller may store the offset in the memory, as represented by block 1214. For example, referring to FIG. 8, the controller 123 may apply an offset (g) to the control pages in the control page pattern 802, 804, 806, 808, such as a weighted average or minimum or maximum value of the control pages, and store the offset in the memory (e.g. volatile memory 118 or the NVM 110). The offset may be used to identify the control page pattern. For instance, after the controller receives read commands and identifies an associated sequence of control pages G1, G2, G3, G4, and G5, the controller may identify the control page pattern 802 to be the first four control pages of the sequence offset by an average or minimum value of the control pages in the sequence (e.g. G1-g, G2-g, G3-g, G4-g).

As represented by block 1216, the controller identifies one or more predicted control pages from the control page pattern. The controller may store the one or more predicted control pages in the memory, as represented by block 1218. For example, referring to FIG. 8, where the identified control page pattern is G1, G3, G3, G4, the controller 123 may generate a key K1 for the above pattern, and identify the predicted control page P1 to be the next control page in the sequence, e.g., G5. The controller may store the predicted control page P1 in the volatile memory 118 or NVM 110.

As represented by block 1220, the controller may predict the one or more of the control pages in the sequence after applying the offset to the one or more predicted control pages. For example, referring to FIG. 8, if the identified control page pattern includes the applied offset such as (G1-g), (G2-g), (G3-g), and (G4-g), the predicted control page P1 may similarly include the applied offset, e.g. (G5-g).

As represented by block 1222, the controller may update the frequency after predicting one or more of the control pages for a subsequent plurality of read commands from the control page pattern. For example, referring to FIG. 8, if the controller 123 identifies the tracked pattern recurring in subsequent read commands, the controller may load the predicted control page in advance of executing the subsequent command. If the prediction is successful, the controller 123 may update the stored frequency indicating a success of the control page pattern.

Finally, as represented by block 1224, the controller may read the one or more of the control pages from the memory (e.g. predicted at block 1204) when the controller reads the data associated with the one or more of the other control pages. For example, referring to FIG. 5A, at block 504, the controller 123 may sense the data associated with the read command L1 from the NAND cells, and at block 506, the controller may simultaneously sense the predicted control information associated with the read command L2 from the NAND cells. Similarly with reference to FIG. 5B, at block 554, the controller may sense the data associated with the read command L1 from the NAND cells, and at blocks 556 and 558, the controller may simultaneously sense the control information associated with the read commands L2 and L3 in parallel from the NAND cells.

Figure 13:
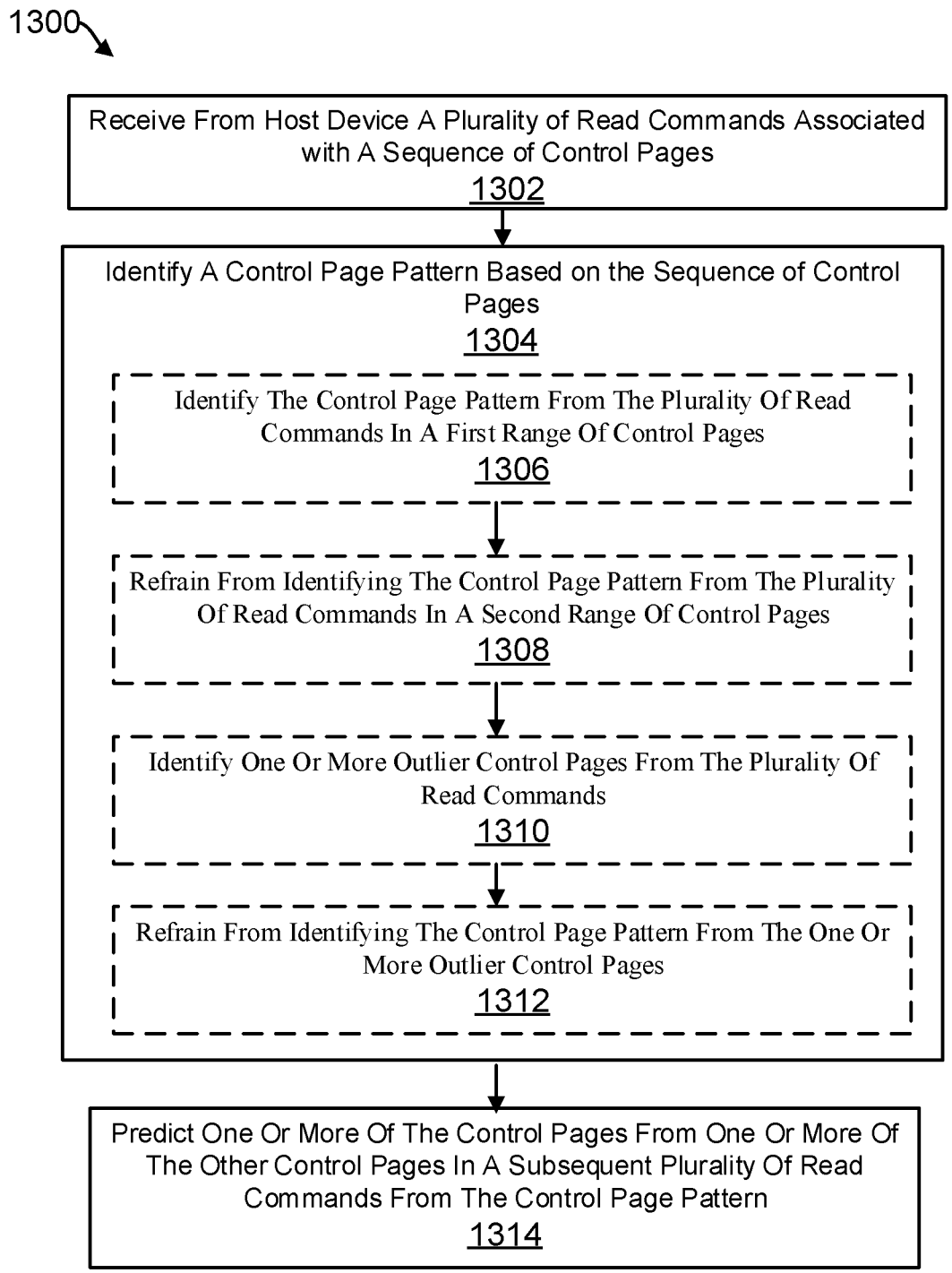
FIG. 13 is a flow chart illustrating another exemplary method for predicting one or more control pages from one or more other control pages.

FIG. 13 is a flowchart 1300 illustrating another exemplary embodiment of a method for predicting one or more control pages from the one or more other control pages. For example, the method can be carried out in a storage device 102, such as the one illustrated in FIG. 1. Each of the steps in the flow chart can be controlled using the controller as described below (e.g. controller 123), or by some other suitable means. As represented by block 1302, the controller receives from a host device a plurality of read commands associated with a sequence of control pages. A memory of the storage device stores data and a plurality of control pages. Each of the control pages includes a plurality of logical addresses associated with the data. For example, block 1302 may be identical to block 1202 of FIG. 12.

As represented by block 1304, the controller identifies a control page pattern based on the sequence of the control pages. For example, referring to FIG. 8, as the controller 123 receives read commands from the host device 104 and tracks the associated control pages, the controller may identify control page patterns 802, 804, 806, 808 and generate unique keys for each pattern. For instance, after the controller receives read commands and identifies an associated sequence of control pages G1, G2, G3, G4, and G5, the controller may identify the control page pattern 802 to be the first four control pages of the sequence (e.g. G1, G2, G3, G4), or the first four control pages of the sequence offset by an average or minimum value of the control pages in the sequence (G1-g, G2-g, G3-g, G4-g).

As represented by block 1306, the controller may identify the control page pattern from the plurality of read commands in a first range of control pages. Moreover, as represented by block 1308, the controller may refrain from identifying the control page pattern from the plurality of read commands in a second range of control pages. The second range of control pages may be separated at least by an offset from the first range of control pages. The offset may comprise an average weightage of the control pages in the sequence of the control pages. For example, referring to FIG. 10, the controller 123 may identify multiple control page patterns 1002, 1004, 1006 located within one range 1007 of control pages, but where one of the control page patterns 1006 is identified by the controller to match another control page pattern 1008 in a different range 1009 of control pages. Each range may be separated from an adjacent range by a specified or calculated offset (e.g. a weighted average of the control pages in a particular range). When the controller 123 identifies a control page pattern (e.g. 1002, 1004, 1006) from read commands in a first range 1007 of control pages, the controller may refrain from identifying the control page pattern from read commands in the second range 1009, 1010, or 1012 of control pages. For instance, if the controller receives a plurality of read commands associated with control pages across different ranges, the controller may ignore control pages in other ranges when identifying control page patterns.

As represented by block 1310, the controller may identify one or more outlier control pages from the plurality of read commands. Moreover, as represented by block 1312, the controller may refrain from identifying the control page pattern from the one or more outlier control pages. The one or more outlier control pages may be in a different range of control pages than the one or more of the control pages predicted for the subsequent plurality of read commands. For example, referring to FIG. 11, the controller 123 may identify multiple outlier control pages 1102 associated with read commands and relative to other control pages 1104. In one example, the outlier control pages 1102 may be associated with file system reads within a single range of control pages (e.g. between control pages 700 and 800). In such case, the controller may refrain from identifying control page patterns from read commands including control pages within this single range (e.g. the outlier control pages) to improve accuracy of pattern tracking and prediction, as described above with respect to FIG. 10.

Finally, as represented by block 1314, the controller may predict one or more of the control pages from one or more of the other control pages in a subsequent plurality of read commands from the control page pattern. For example, referring to FIGS. 1 and 5A-5B, the controller 123 may be configured to identify a control page pattern based on the sequence of control pages (e.g. as described above with respect to blocks 1304, 1306, 1308, 1310, and 1312), and to identify one or more predicted control pages from the control page pattern. When the controller subsequently receives a plurality of read commands associated with a sequence including this same control page pattern, the controller may predict one or more control pages for the subsequent read commands from the other control pages in the sequence. As a result, the controller 123 may load that predicted control page in advance, e.g. as described in connection with blocks 506, 508, 516, 520, 556, 558, and 560 of FIGS. 5A and 5B, thereby more fully utilizing the available bandwidth of the storage device 102 and improving storage device performance.

Accordingly the present disclosure improves the random performance of the storage device by allowing faster read command processing in lower queue depth environments. By identifying control page patterns from prior read commands and predicting control pages to be loaded in advance for subsequent read commands, the controller may access the data from the NAND cells with reduced latency without requiring control information to be restricted to foreground operation. Additionally, the controller's operation of predicting control pages, as opposed to caching actual data, requires less memory and improves the performance of lower cost storage devices.

The various aspects of this disclosure are provided to enable one of ordinary skill in the art to practice the present invention. Various modifications to exemplary embodiments presented throughout this disclosure will be readily apparent to those skilled in the art, and the concepts disclosed herein may be extended to other magnetic storage devices. Thus, the claims are not intended to be limited to the various aspects of this disclosure, but are to be accorded the full scope consistent with the language of the claims. All structural and functional equivalents to the various components of the exemplary embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) in the United States, or an analogous statute or rule of law in another jurisdiction, unless the element is expressly recited using the phrase "means for" or, in the case of a method claim, the element is recited using the phrase "step for."

What is claimed is:

1. A storage device, comprising:
   memory configured to store data and a plurality of control pages, each of the control pages including a plurality of logical addresses associated with the data; and
   a controller configured to receive from a host device a plurality of read commands associated with a sequence of the control pages, the controller being further configured to predict one or more of the control pages from one or more of the other control pages in the sequence;
   wherein the controller is further configured to identify one or more outlier control pages from the plurality of read commands, and to refrain from identifying a control page pattern from the one or more outlier control pages.

2. The storage device of claim 1, wherein the controller is further configured to read the one or more of the control pages from the memory when the controller reads the data associated with the one or more of the other control pages.

3. The storage device of claim 1, wherein the plurality of read commands associated with the sequence of the control pages comprises one of consecutive read commands or non-consecutive read commands received from the host device.

4. The storage device of claim 1, wherein the controller is further configured to identify the control page pattern based on the sequence of the control pages, and to identify one or more predicted control pages from the control page pattern.

5. The storage device of claim 4, wherein the controller is further configured to apply an offset to the one or more of the other control pages in the sequence to identify the control page pattern.

6. The storage device of claim 5, wherein the offset comprises one of an average weightage or a minimum weightage of the one or more of the other control pages in the sequence.

7. The storage device of claim 5, wherein the controller is further configured to predict the one or more of the control pages in the sequence after applying the offset to the one or more predicted control pages.

8. A storage device, comprising:
   memory configured to store data and a plurality of control pages, each of the control pages including a plurality of logical addresses associated with the data; and
   a controller configured to receive from a host device a plurality of read commands associated with a sequence of the control pages, the controller being further configured to identify a control page pattern based on the sequence of the control pages, and to store the control page pattern in the memory;
   wherein the controller is further configured to identify one or more outlier control pages from the plurality of read commands, and to refrain from identifying the control page pattern from the one or more outlier control pages.

9. The storage device of claim 8, wherein the controller is further configured to identify one or more predicted control pages from the control page pattern, and to store the one or more predicted control pages in the memory.

10. The storage device of claim 8, wherein the controller is further configured to store a frequency associated with the control page pattern in the memory.

11. The storage device of claim 10, wherein the controller is further configured to update the frequency after predicting one or more of the control pages for a subsequent plurality of read commands from the control page pattern.

12. The storage device of claim 8, wherein the controller is further configured to apply an offset to the sequence of the control pages to identify the control page pattern, and to store the offset in the memory.

13. The storage device of claim 12, wherein the offset comprises one of an average weightage or a minimum weightage of the control pages in the sequence.

14. A storage device, comprising:
   memory configured to store data and a plurality of control pages, each of the control pages including a plurality of logical addresses associated with the data; and
   a controller configured to receive from a host device a plurality of read commands associated with a sequence of the control pages, the controller being further configured to identify a control page pattern based on the sequence of the control pages, and to predict one or more of the control pages from one or more of the other control pages in a subsequent plurality of read commands from the control page pattern;
   wherein the controller is further configured to identify one or more outlier control pages from the plurality of read commands, and to refrain from identifying the control page pattern from the one or more outlier control pages.

15. The storage device of claim 14, wherein the controller is further configured to read the one or more of the control pages from the memory when the controller reads the data associated with the one or more of the other control pages.

16. The storage device of claim 14, wherein the controller is further configured to identify the control page pattern from the plurality of read commands in a first range of control pages, and to refrain from identifying the control page pattern from the plurality of read commands in a second range of control pages.

17. The storage device of claim 16, wherein the second range of control pages is separated at least by an offset from the first range of control pages.

18. The storage device of claim 17, wherein the offset comprises an average weightage of the control pages in the sequence of the control pages.

19. The storage device of claim 14, wherein the one or more outlier control pages are in a different range of control pages than the one or more of the control pages predicted for the subsequent plurality of read commands.

* * * * *